US012706293B2

(12) United States Patent
Chernushevich et al.

(10) Patent No.: US 12,706,293 B2
(45) Date of Patent: Aug. 11, 2026

(54) REDUCING AC EFFECTS ON IONS ENTERING ION GUIDE WITH PULSING AUXILIARY AC

(71) Applicant: DH TECHNOLOGIES DEVELOPMENT PTE. LTD., Singapore (SG)

(72) Inventors: Igor Chernushevich, Toronto (CA); Pavel Ryumin, Toronto (CA); Takashi Baba, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 348 days.

(21) Appl. No.: 18/559,108

(22) PCT Filed: May 3, 2022

(86) PCT No.: PCT/IB2022/054078
§ 371 (c)(1),
(2) Date: Nov. 6, 2023

(87) PCT Pub. No.: WO2022/234452
PCT Pub. Date: Nov. 10, 2022

(65) Prior Publication Data

US 2024/0242958 A1 Jul. 18, 2024

Related U.S. Application Data

(60) Provisional application No. 63/184,815, filed on May 6, 2021.

(51) Int. Cl.
*H01J 49/42* (2006.01)
*H01J 49/38* (2006.01)

(52) U.S. Cl.
CPC .......... *H01J 49/4225* (2013.01); *H01J 49/38* (2013.01); *H01J 49/4245* (2013.01)

(58) Field of Classification Search
CPC .... H01J 49/4225; H01J 49/38; H01J 49/4245; H01J 49/0045; H01J 49/0031
See application file for complete search history.

(56) References Cited

U.S. PATENT DOCUMENTS 5,164,593 A * 11/1992 Chapman ................ H01J 49/24 250/288
5,166,518 A * 11/1992 Freedman ............... H01J 49/32 250/296

(Continued)

FOREIGN PATENT DOCUMENTS

EP 0109251 A2 * 5/1984 .......... H01J 49/0409
EP 1082750 B1 * 11/2005 ............ H01J 49/147

(Continued)

OTHER PUBLICATIONS

International Search Report and Written Opinion for PCT/IB2022/054078, mailed Jul. 18, 2022.

(Continued)

*Primary Examiner* — David A Vanore
(74) *Attorney, Agent, or Firm* — Potomac Law Group, PLLC; Reza Mollaaghababa; Ido Rabinovitch

(57) ABSTRACT

During an accumulation time period of each time cycle of an ion guide and before a ramped AC voltage is applied to at least one set of axial rods to eject ions according to m/z value, a number of steps are performed. Ions are received from outside of the ion guide through an entrance aperture and into a first cell. A low DC voltage is applied to a barrier electrode to receive ions from the first cell into a second cell. And, a high DC voltage is applied to an exit electrode to prevent ions from exiting the ion guide. During a cooling time period before the AC time period, a high DC voltage is applied to the barrier electrode to trap and cool ions in the (Continued)

second cell and to continue to receive ions into the first cell without being affected by the ramped AC voltage.

15 Claims, 23 Drawing Sheets

(56) References Cited

U.S. PATENT DOCUMENTS

| | | | | |
|---|---|---|---|---|
| 6,639,214 | B1 * | 10/2003 | Ketkar | G01N 27/622 250/288 |
| 6,987,261 | B2 * | 1/2006 | Horning | H01J 49/4265 250/288 |
| 7,456,388 | B2 * | 11/2008 | Loboda | H01J 49/062 250/396 R |
| 2005/0247872 | A1 | 11/2005 | Loboda et al. | |
| 2005/0253064 | A1 | 11/2005 | Loboda et al. | |
| 2006/0219933 | A1 * | 10/2006 | Wang | H01J 49/421 250/396 R |
| 2017/0221692 | A1 * | 8/2017 | Baba | H01J 49/403 |
| 2020/0279727 | A1 * | 9/2020 | Baba | G01N 33/92 |
| 2021/0257200 | A1 * | 8/2021 | Baba | H01J 49/0031 |
| 2021/0351025 | A1 * | 11/2021 | Guna | H01J 49/004 |
| 2021/0366701 | A1 * | 11/2021 | Bloomfield | H01J 49/025 |
| 2022/0051887 | A1 * | 2/2022 | Dziekonski | H01J 49/4245 |
| 2022/0093383 | A1 * | 3/2022 | Haufler | H01J 49/147 |
| 2024/0038524 | A1 * | 2/2024 | Sugiyama | H01J 49/065 |
| 2024/0242958 | A1 * | 7/2024 | Chernushevich | H01J 49/4225 |
| 2024/0393301 | A1 * | 11/2024 | Fort | G01N 27/623 |

FOREIGN PATENT DOCUMENTS

| | | | | |
|---|---|---|---|---|
| WO | 2006103448 A2 | | 10/2006 | |
| WO | WO-2016020789 A1 | * | 2/2016 | H01J 49/429 |
| WO | WO-2016042632 A1 | * | 3/2016 | H01J 49/06 |
| WO | WO-2017122339 A1 | * | 7/2017 | H01J 49/24 |
| WO | WO-2018020712 A1 | * | 2/2018 | H01J 49/065 |
| WO | WO-2019198010 A1 | * | 10/2019 | H01J 49/0022 |
| WO | WO-2020044159 A1 | * | 3/2020 | H01J 49/0077 |
| WO | WO-2020044160 A1 | * | 3/2020 | H01J 49/0031 |
| WO | WO-2020121168 A1 | * | 6/2020 | H01J 49/482 |
| WO | WO-2020153116 A1 | * | 7/2020 | A63F 13/428 |
| WO | WO-2020250157 A1 | * | 12/2020 | H01J 49/147 |
| WO | WO-2021137293 A1 | * | 7/2021 | H01J 49/26 |
| WO | WO-2022234452 A1 | * | 11/2022 | H01J 49/4225 |
| WO | WO-2022243775 A1 | * | 11/2022 | H01J 49/0009 |

OTHER PUBLICATIONS

Loboda et al.: "A Novel lon Trap that Enables High Duty Cycle and Wide m/z Range on an Orthogonal Injection TOF Mass Spectrometer," Journal of the American Society for Mass Spectrometry, Elsevier Science Inc., US, vol. 20, No. 7, Jul. 1, 2009, pp. 1342-1348, xp026494940, ISSN: 1044-0305.

* cited by examiner

REDUCING AC EFFECTS ON IONS ENTERING ION GUIDE WITH PULSING AUXILIARY AC

RELATED APPLICATIONS

This application claims the benefit of U.S. Provisional Patent Application Ser. No. 63/184,815, filed on May 6, 2021, the content of which is incorporated by reference herein in its entirety.

INTRODUCTION

The teachings herein relate to controlling a mass spectrometer to dynamically concentrate ion packets in a region of a mass analyzer within a targeted acquisition experiment without causing unwanted fragmentation or loss due to strong alternating current (AC) fields. More specifically, systems and methods are provided to decrease the duration of a ramped AC voltage applied in an ion guide that sequentially ejects and concentrates ion packets in order to reduce or eliminate unwanted effects of the AC voltage on ions approaching or entering the ion guide.

The systems and methods herein can be performed in conjunction with a processor, controller, or computer system, such as the computer system of FIG. 1.

Tandem Mass Spectrometry Background

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

LC-MS and LC-MS/MS Background

The combination of mass spectrometry (MS) (or mass spectrometry/mass spectrometry (MS/MS)) and liquid chromatography (LC) is an important analytical tool for identification and quantification of compounds within a mixture. Generally, in liquid chromatography, a fluid sample under analysis is passed through a column filled with a solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to mass spectrometric analysis to generate an extracted ion chromatogram (XIC) or LC peak, which can depict detected ion intensity (a measure of the number of detected ions, total ion intensity or of one or more particular analytes) as a function of elution or retention time.

In some cases, the LC effluents can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. The selected precursor ions can then be fragmented (e.g., via collision induced dissociation), and the fragmented ions (product ions) can be analyzed via a subsequent stage of mass spectrometry.

Fragmentation Techniques Background

Electron-based dissociation (ExD), ultraviolet photodissociation (UVPD), infrared photodissociation (IRMPD), and collision-induced dissociation (CID) are often used as fragmentation techniques for tandem mass spectrometry (MS/MS). CID is the most conventional technique for dissociation in tandem mass spectrometers.

ExD can include, but is not limited to, electron-induced dissociation (EID), electron impact excitation in organics (EIEIO), electron capture dissociation (ECD), or electron transfer dissociation (ETD).

Tandem Mass Spectrometry Acquisition Methods

A large number of different types of experimental acquisition methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined or known for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS can be repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

Ion Guide for Concentrating Ion Packets

U.S. Pat. No. 7,456,388 (hereinafter the "'388 patent") issued on Nov. 25, 2008, and incorporated herein by reference, describes an ion guide for concentrating on packets. The '388 patent provides apparatus and methods that allow, for example, analysis of ions over broad m/z ranges with virtually no transmission losses. The ejection of ions from an ion guide is affected by creating conditions where all ions (regardless of m/z) may be made to arrive at a designated point in space, such as an extraction region or accelerator of a TOF mass analyzer, in a desired sequence or at a desired time and with roughly the same energy. Ions bunched in such a way can then be manipulated as a group, for example, by being extracted using a TOF extraction pulse and propelled along a desired path in order to arrive at the same spot on a TOF detector.

To make heavier and lighter ions with the same energy meet at a point in space such as the extraction region of a mass analyzer at substantially the same time, heavier ions can be ejected from the ion guide before lighter ions. Heavier ions of a given charge travel more slowly in an electromagnetic field than lighter ions of the same charge, and therefore can be made to arrive at the extraction region or other point at the same time as, or at a selected interval with respect to, the lighter ions if released within a field in a desired sequence. The '388 patent provides mass-correlated ejection of ions from the ion guide in a desired sequence.

FIG. 2 is an exemplary schematic diagram 200 of a mass spectrometer. The mass spectrometer of FIG. 2 is described in the '388 patent, for example. Apparatus 30 comprises a mass spectrometer including ion source 20, ion guide 24, and TOF mass analyzer 28. Ion source 20 can include any type of source compatible with the purposes described herein, including for example sources which provide ions through electrospray ionization (ESI), matrix-assisted laser desorption ionization (MALDI), ion bombardment, application of electrostatic fields (e.g., field ionization and field desorption), chemical ionization, etc.

Ions from ion source 20 may be passed into an ion manipulation region 22, where ions can be subjected to ion beam focusing, ion selection, ion ejection, ion fragmentation, ion trapping, or any other generally known forms of ion analysis, ion chemistry reaction, or ion transmission. Ions so manipulated can exit the manipulation region 22 and pass into an ion guide indicated by 24.

Ion guide 24 defines axis 174 and comprises inlet 38, exit 42 and exit aperture 46. Ion guide 24 is adapted to generate or otherwise provide an ion control field comprising a component for restraining movement of ions in directions normal to the guide axis and a component for controlling the movement of ions parallel to the guide axis.

Ion guide 24 may include multiple sections or portions and/or auxiliary electrodes. As will be explained in greater detail below, ion guide 24 of spectrometer 30 is operable to eject ions of different masses and/or m/z ratios from exit 42, while maintaining radial confinement along axis 174 within and beyond the ion guide 24, such that the ions arrive at a desired point substantially along the axis of the ion guide, or in a desired proximity thereto, such as within extraction region 56 of TOF mass analyzer 28, adjacent to push plate 54, at substantially the same time, or in a desired sequence.

Ions ejected from ion guide 24 can be focused or otherwise processed by further apparatus, such as electrostatic lens 26 (which may be considered a part of guide 24) and/or mass analyzer 28. Spectrometer 30 can also include devices such as push plate 54 and accelerating column 55, which may, for example, be part of an extraction mechanism of mass analyzer 28.

FIG. 3 is an exemplary schematic diagram 300 of the ion guide, electrostatic lens, and mass analyzer of the '388 patent along with an accumulation potential profile of the ion guide. Accumulation potential profile 58 of FIG. 3 represents relative potential values, such as voltages or pressures, provided along axis 174 of ion guide 24. The relative potential at portion 34*a* of ion guide 24 is indicated at 90, the potential provided at portions 34*b* and 34*c* is indicated at 91, and the potential gradient provided across portion 34*c* of the ion guide 24 and exit 42 of aperture 46 is indicated at 92. Although not shown, an RF voltage is applied to ion guide 24 for providing confinement of the ions in the radial direction. Thus, an ion control field comprising a component for restraining movement of ions in directions normal to the guide axis and a component for controlling the movement of ions parallel to the guide axis is provided in ion guide 24.

Provision of an accumulation potential 58 such as that shown in FIG. 3 within ion guide 24 allows large ions 62 (i.e., ions having large m/z values) and small ions 66 (i.e., ions having small m/z values) to traverse ion guide 24 in a direction parallel to axis 174 and settle into the preferential region proximate to electrodes 34*b* and 34*c* provided by the low potential at 91, but prevents them from exiting the ion guide 24 by providing a higher potential on the aperture 46. As will be familiar to those skilled in the relevant arts, it may be beneficial in some circumstances to apply a DC offset voltage on ion guide 24 in addition to the DC voltage mentioned above. In that instance, the overall potential profile 58 would be elevated by the corresponding DC offset voltage.

FIG. 4 is an exemplary schematic diagram 400 of the ion guide, electrostatic lens, and mass analyzer of the '388 patent along with a pre-ejection potential profile of the ion guide. Pre-ejection potential profile 70 of FIG. 4 represents relative potential values, such as voltages or pressures, provided along axis 174 of ion guide 24. In the example shown in FIG. 4, pre-ejection profile 70 is similar to that described for accumulation potential profile 58 of FIG. 3, but with potential 91 replaced by potential 96 at portion 34*b* of the ion guide 24 and corresponding changes in potential gradient 92. Thus, a modified ion control field comprising a component for restraining movement of ions in directions normal to the guide axis and a component for controlling the movement of ions parallel to the guide axis is provided in ion guide 24.

Provision of a pre-ejection profile 70 such as that shown in FIG. 4 can, for example, be used to cause ions 62 of relatively larger m/z and ions 66 of relatively smaller m/z to move within ion guide 24 in a direction parallel to axis 174 and settle within the region of ion guide 24 between portion 34*b* of the guide and aperture 46. The potential at 96 can also prevent additional ions from entering ion guide 24 to a point beyond portion 34*b*.

FIG. 5 is an exemplary schematic diagram 500 of the ion guide, electrostatic lens, and mass analyzer of the '388 patent along with an ejection potential profile of the ion guide. Ejection potential profile 74 of FIG. 5 can be created by, for example, applying an alternating current ("AC") voltage within portion 34*c* of ion guide 24 and/or at an exit aperture 46, superimposed on voltages otherwise applied to the ion guide 24. For example, appropriate RF and DC potentials may be applied to opposed pairs of electrodes within an ion guide 24, along with suitable DC offset voltages applied to various sets of electrodes. The AC voltage can, for example, be superimposed over the RF voltage, while a difference between a potential at portion 34*c* and a potential at exit aperture 46 is reduced.

Ejection potential profile 74 along the axis of guide 24 can be provided by, for example, using a pseudopotential such as that represented by dashed lines at reference 78 in FIG. 5.

For example, at the beginning of an ejection cycle such as cycle 74 represented in FIG. 5, the magnitude or depth of a pseudopotential 78 may be chosen so that ions 62 of larger m/z ratios will leave exit 42 first. As the larger m/z ions 62 are released, the amplitude of the AC voltage may be gradually reduced to change the depth of the pseudopotential 78 well, and after a desired delay, to allow ions 66 of smaller m/z to leave ion guide 24. The delay may be determined by controlling the rate of change of the AC amplitude, and may, for example, be chosen based on the masses and/or m/z ratios of ions 62 and 66 to achieve a desired delay. In the situation shown in FIG. 5, ions 66 of smaller m/z travel faster than the ions 62 of larger m/z and gradient 78 is set accordingly. Gradient 78 is used to describe a variation of some parameter in space, but not in time.

Ions are provided to a desired point in space 56 disposed on, or substantially along, guide axis 174, as for example an extraction region in a TOF analyzer for detection and mass analysis using methods generally known in the art. This is represented at the right-hand portion of FIG. 5, where the different rates of travel of ions 62 and 66 have resulted in ions 62 and 66 reaching the orthogonal extraction region 56 in front of push plate 54, at substantially the same time. At this point, an extraction pulse 82 may be applied to push plate 54 to pulse ions 62, 66 through the accelerating column 55.

On Demand Concentration of Ion Packets in IDA

In a paper entitled "A Novel Ion Trap That Enables High Duty Cycle and Wide m/z Range on an Orthogonal Injection TOF Mass Spectrometer" by Alexander V. Loboda and Igor V. Chernushevich published in the Journal of the American Society of Mass Spectrometry in July of 2009, vol. 20, no. 7, (hereinafter the "Loboda Paper") it was suggested that the method of concentrating ion packets described in the '388 patent could be applied "on demand" in IDA acquisitions. The Loboda Paper refers to the method of concentrating ion packets described in the '388 patent as Zeno pulsing.

The Loboda Paper found that Zeno pulsing "enables almost 100% duty cycle over a wide m/z-range from 120 to 2000, resulting in sensitivity gains from 3 to 14 without loss of mass accuracy or resolution." However, due to the "reduced linear dynamic range, the application strategy may involve using this method in MS/MS only, where intensities are in general several orders of magnitude lower than in TOF MS, and where an average gain of 7 is more valuable."

Sensitivity gain is the observed change in ion current per given mass range, for example. The linear dynamic range of a detection subsystem is, for example, the maximum linear response signal divided by the signal at the limit of detection (LOD).

In other words, the Loboda Paper found that although Zeno pulsing allowed a wide m/z-range to be analyzed at once, the larger number of ions detected could cause the detection subsystem to saturate more easily thereby reducing the linear dynamic range.

As a result, the Loboda Paper suggested applying Zeno pulsing on demand in IDA acquisition experiments that are triggered by low intensity precursor ions found in the single MS experiments where large sensitivity gains are more valuable. As described above, in an IDA method, a single precursor ion or mass spectrometry (MS) survey scan is performed to generate a precursor ion peak list. MS/MS is then performed on each precursor ion of the list. MS/MS is repeatedly performed on the precursor ions of the list as the sample is being introduced into the tandem mass spectrometer, for example.

As a result, the Loboda Paper suggested monitoring the single MS survey scan for precursor ions with intensities below a certain threshold. For those precursor ions with intensities below the threshold, Zeno pulsing would be turned on for the one or more MS/MS experiments of each precursor ion.

FIG. 6 is an exemplary diagram 600 showing the MS (precursor ion) spectra and MS/MS (product ion spectra) of an on demand IDA method of the Loboda Paper. In the IDA method, a single MS survey scan is performed, producing precursor ion spectrum 601. From precursor ion spectrum 601 an IDA precursor ion peak list is obtained. In this case, the peak list only includes precursor ions 610, 620, and 630.

The Loboda Paper describes performing on demand Zeno pulsing "in those MS/MS experiments that are triggered by low intensity precursor ions in single MS experiments." In FIG. 6, for example, precursor ion 610 is below an intensity threshold 640, and precursor ions 620 and 630 are above intensity threshold 640. As a result, precursor ion 610 is a low intensity precursor ion in precursor ion spectrum 601 of a single MS experiment.

Consequently, Zeno pulsing is performed in the MS/MS experiment of precursor ion 610. The MS/MS experiment of precursor ion 610 is represented in FIG. 6 by product ion spectrum 611.

In precursor ion spectrum 601, however, precursor ions 620 and 630 are above intensity threshold 640, so Zeno pulsing is not performed in the MS/MS experiments of precursor ions 620 and 630. The MS/MS experiments of precursor ions 620 are represented in FIG. 6 by product ion spectra 621 and 631, respectively.

As shown in FIG. 6, on demand Zeno pulsing of the Loboda paper entails selectively using Zeno pulsing in product ion experiments based on the intensity of precursor ions in a single precursor ion experiment.

One aspect of the implementation of Zeno pulsing in the Loboda Paper effectively limits on demand Zeno pulsing to IDA acquisition experiments. This aspect is the switching between normal mode and Zeno pulsing mode. More specifically, the Loboda Paper describes that, when switching between the two modes, the TOF repetition or pulsing rate is changed. It lists a TOF repetition rate of between 13 and 18 kHz for normal mode and a rate of between 1 and 1.25 kHz for Zeno pulsing mode.

This change in the TOF repetition rate is not instantaneous. The electronics of the TOF accelerator need time to settle. A pause may be needed for example to maintain the same pulse amplitude after changing the repetition rate. The Loboda Paper describes this switching time or settle time to be in the millisecond range, which was more likely tens or hundreds of milliseconds. As a result, the implementation of the Loboda Paper requires a delay in switching between the normal and Zeno pulsing modes.

FIG. 7 is an exemplary timing diagram 700 showing the two different TOF extraction pulses of a TOF mass analyzer for normal pulsing mode and Zeno pulsing mode and the settle time needed for switching between the two modes. In region 710 normal extraction pulsing is occurring every 0.1 ms for a TOF repetition rate of 10 kHz. Note that this repetition rate is used for illustrative purposes and the normal TOF repetition rate is typically higher as described above.

At 1 ms, the TOF repetition rate is switched to 1 kHz for Zeno pulsing. However, the electronics of the TOF accelerator need time to settle. In FIG. 7, region 720 represents 10 ms of settle time. Again, a 10 ms period for the settle time is used for illustrative purposes and the actual settle time can typically be longer as described above.

After the settle time, the TOF mass analyzer continues to analyze the sample at the TOF repetition rate of about 1 kHz. This repetition rate translates to one pulse every 1 ms, which is shown in region 730.

FIG. 7 illustrates that the settle time or switching time between the normal and Zeno pulsing modes as described in the Loboda paper is significant when compared to normal and Zeno pulsing periods. Although significant, the Loboda paper, found this delay to be acceptable for an IDA acquisition method. This is because IDA acquisition is typically used for identification where the precise shape or area of a particular chromatographic peak is not necessary. In other words, in IDA identification methods, it is not as necessary to quickly switch between normal and Zeno pulsing modes as it may be in other methods such as targeted methods for quantification.

Dynamic Switching Between Normal and Zeno Pulsing Modes

International Patent Application No. WO2019/198010 (hereinafter the "'010 application") describes systems and methods for switching between normal and Zeno pulsing modes in acquisition methods other than IDA. As described in the '010 application, the large gain in sensitivity produced by Zeno pulsing is obtained and saturation is avoided by dynamically switching between Zeno pulsing mode and normal pulsing mode within the same quantitative targeted acquisition experiment. In addition, the switching between pulsing modes is triggered by the intensity of a previous product ion. In other words, if the intensity of a previous product ion exceeds a certain threshold, Zeno pulsing mode is turned off and normal pulsing mode is turned on. Similarly, if the intensity of a previous product ion is less than or equal to a certain threshold, normal pulsing mode is turned off and Zeno pulsing mode is turned back on.

FIG. 8 is an exemplary diagram 800 showing how dynamic switching between Zeno pulsing mode and normal pulsing mode is used to obtain an XIC in a quantitative targeted acquisition method with increased sensitivity and without saturation. In FIG. 8, the product ion intensity for the same single precursor ion to product ion transition 801 is measured at nine different time steps or cycles. At each time step, the precursor ion of transition 801 is selected and fragmented, and the intensity of the product ion of transition 801 is measured.

Initially, the intensities of the product ion of transition 801 are measured using the Zeno pulsing mode. For example, at time steps 1, 2, and 3, the intensities are measured using the Zeno pulsing mode. Zeno pulsing is used initially because the intensities are low and can benefit from the higher sensitivity of Zeno pulsing. The intensities at time steps 1, 2, and 3 are shown plotted in chromatogram 810.

In order to prevent saturation, the intensities at time steps 1, 2, and the 3 are each compared to a Zeno pulsing mode intensity threshold 815, for example. If the measured intensity is greater than Zeno pulsing mode intensity threshold 815 and the previously measured intensity in Zeno pulsing mode is less than the measured intensity, then the tandem mass spectrometer is switched from Zeno pulsing mode to normal pulsing mode. For example, at time step 3, the measured intensity is greater than Zeno pulsing mode intensity threshold 815. The measured intensity at time step 3 is also greater than the measured intensity at time step 2, showing that the measured ion intensity is increasing. As a result, saturation is likely, so the pulsing mode is switched to normal mode.

At time step 4, the intensity of the product ion of transition 801 is now measured using the normal pulsing mode. This intensity is plotted in chromatogram 820. Note that in normal pulsing mode the intensities are reduced to 1/7 the intensities in Zeno pulsing mode. Consequently, saturation is prevented.

Mass analysis continues in normal pulsing mode until the measured intensity decreases below a normal pulsing mode intensity threshold 825. For example, normal pulsing mode is used to measure the intensity at time steps 5 and 6 in addition to time step 4.

At time step 6, however, the measured intensity is less than normal pulsing mode intensity threshold 825. In addition, the measured intensity at time step 6 is also less than the measured intensity at time step 5, showing that the measured ion intensity is decreasing. As a result, saturation is not likely to occur, so the Zeno pulsing mode is switched back on to increase sensitivity. Consequently, at time steps 7, 8, and 9, the intensities are measured using the Zeno pulsing mode. The intensities at time steps 7, 8, and 9 are shown plotted in chromatogram 810.

Due to the switching from Zeno mode pulsing to normal mode pulsing and back again to Zeno mode pulsing, the intensities of the product ion of transition 801 in chromatograms 810 and 820 must be combined to calculate an XIC peak. However, the scales of intensity in chromatograms 810 and 820 differ by a factor of 7.

As a result, the intensities of one of the chromatograms need to be scaled or normalized to the intensities of the other chromatogram. Because calibration data used for the quantitation is typically obtained in normal pulsing mode, the intensities measured using Zeno pulsing mode are preferably normalized to the intensities measured using normal pulsing mode. In other words, and as shown in FIG. 8, the intensities of chromatogram 810 are scaled or normalized to the intensities of chromatogram 820 producing chromatogram 830.

Note that the factor of 7 is an average Zeno pulsing gain for the particular instrument described in Loboda Paper. In reality it is different depending on the geometry of the machine, and is also different for ions with different m/z, varying from 3 to about 25. There is a formula predicting gain dependence on m/z value $$\text{Gain} = C\sqrt{\frac{(m/z)_{max}}{(m/z)}},$$

where C is a geometrical factor, (m/z)max is the largest value of m/z recorded in spectra.

Now that chromatogram 820 and chromatogram 830 have the same intensity scale, they can be combined. For example, chromatogram 820 and chromatogram 830 are added producing chromatogram 840. An XIC peak 845 is finally calculated from chromatogram 840. XIC peak 845 is used for quantitation.

FIG. 8 shows that by basing the dynamic switching between Zeno and normal pulsing modes on a product ion rather than a precursor ion, as suggest in the Loboda Paper, dynamically controlled Zeno pulsing mode can be used in a targeted acquisition method. As implemented in the Loboda paper, such mode switching was not fast enough for targeted acquisition because of the required settle time between modes.

In the '010 application, dynamic switching between Zeno and normal pulsing modes is implemented without changing the TOF repetition rate. As a result, there is no settle time delay between modes.

Unwanted Fragmentation or Loss in Dynamic Zeno Pulsing

As shown in FIG. 8, in LC-MS/MS quantitation experiments that apply dynamic switching between Zeno and normal pulsing modes, Zeno and non-Zeno data is stitched together to provide peaks used for quantitation. For example, Zeno data from chromatogram 810 is added to non-Zeno data from chromatogram 820. However, the Zeno pulsing gain of chromatogram 810 must be taken into account before adding the Zeno and non-Zeno data. As described above, there is a theoretical formula for predicting Zeno pulsing gain based on m/z value. The Zeno pulsing gain can also, for example, be based on duty cycle loses in non-Zeno mode.

Recently, however, it was discovered that dynamic switching between Zeno and normal pulsing modes can result in ion fragmentation, loss, or both fragmentation and loss. This fragmentation, loss, or both fragmentation and loss likely occurs at the entrance to the Zeno ion guide as the ions encounter the gradient of the AC voltage. In some extreme cases, ions have been found to exceed the theoretical Zeno pulsing gain by a factor of up to six. Such unpredictable Zeno pulsing gains can result in discontinuous stitching of XIC traces. This, in turn, can produce large quantitation errors.

In other words, some compounds do not show the predicted gain in Zeno mode as compared to non-Zeno mode. This appears to be due to additional ion fragmentation, loss, or both fragmentation and loss as the ions are energized by the gradient of the axial radio frequency (RF) field (or AC voltage) used in Zeno pulsing. As described above, calculating a theoretical or predicted Zeno pulsing gain is critical in dynamic switching between Zeno and normal pulsing modes. If a predicted Zeno pulsing gain cannot be used, calibration is required for each compound, greatly increasing the complexity of using Zeno pulsing in quantitation.

As a result, systems and methods are needed to prevent unwanted ion fragmentation, loss, or both fragmentation and loss during Zeno pulsing in order to produce predictable Zeno pulsing gains for all compounds, when dynamically switching between Zeno and normal pulsing modes.

SUMMARY

An ion guide, method, and computer program product are disclosed for sequentially ejecting ions according to m/z value using a ramped AC voltage, while reducing or eliminating the effects of the AC voltage on ions entering the ion guide.

The ion guide includes at least one set of axial rods surrounding an axial ion path. The ion guide includes an entrance aperture at one end of the axial rods through which ions are received axially into the ion path. Ion guide includes an exit electrode at the other end of the axial rods through which ions are ejected axially from the ion path. Finally, the ion guide includes a barrier electrode located between the entrance aperture and the exit electrode. The barrier electrode separates the axial path into a first cell (e.g., the collision cell) between the entrance aperture and the barrier electrode and a second cell (e.g., the Zeno cell) between the barrier electrode and the exit electrode.

Each time cycle of the ion guide includes an accumulation time period and a cooling time period before an AC time period in which a ramped AC voltage is applied to the axial rods to eject ions according to m/z value.

During the accumulation time period, ions are received from outside of the ion guide through the entrance aperture and into the first cell. A low DC voltage is applied to the barrier electrode to receive ions from the first cell into the second cell. And, a high DC voltage is applied to the exit electrode to prevent ions from exiting the ion guide.

During the cooling time period, a high DC voltage is applied to the barrier electrode to trap and cool ions in the second cell and to allow ions to continue to be received into the first cell without being affected by the ramped AC voltage.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
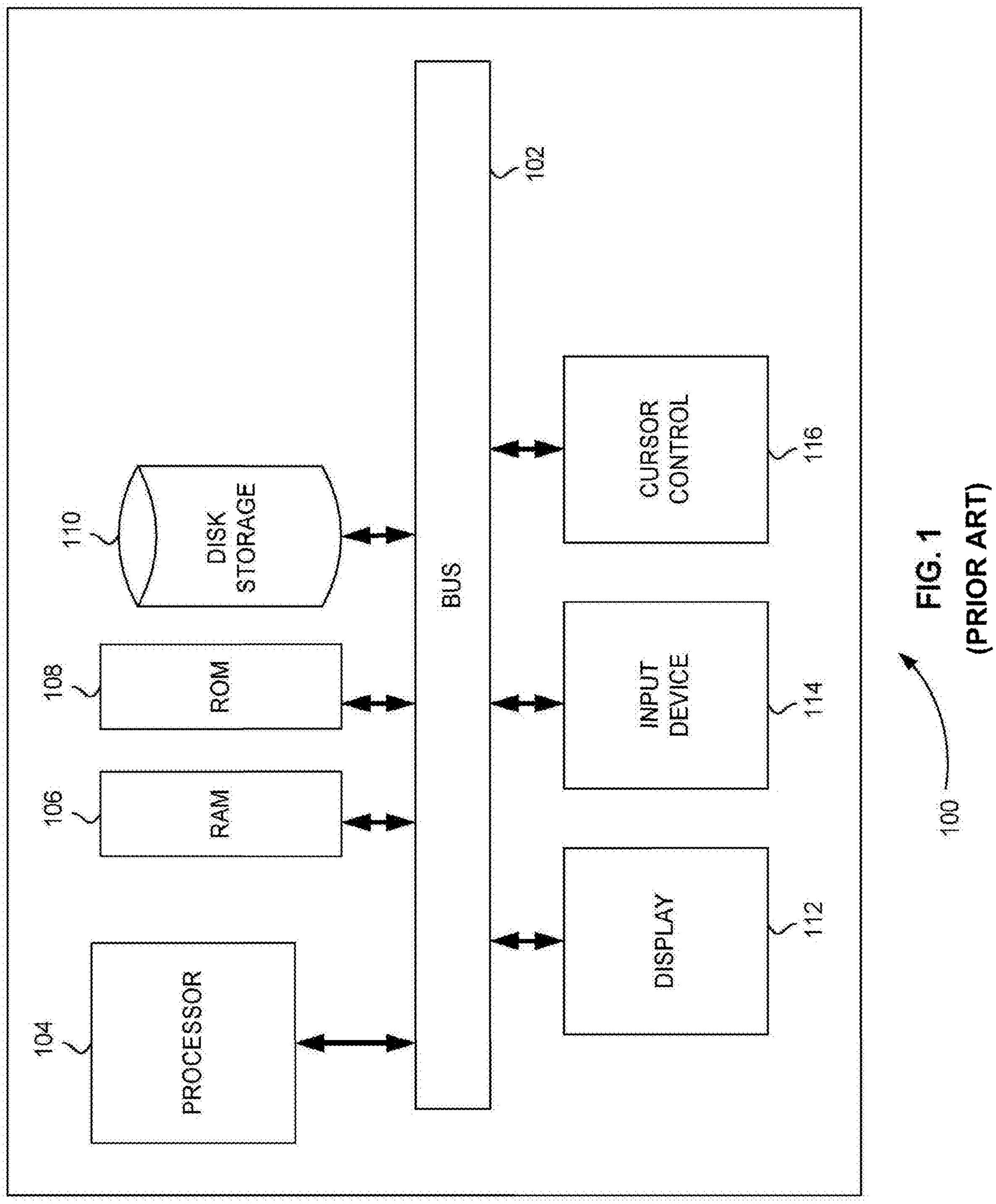
FIG. 1 (PRIOR ART)
FIG. 1 is a block diagram that illustrates a computer system, upon which embodiments of the present teachings may be implemented.
Figure 2:
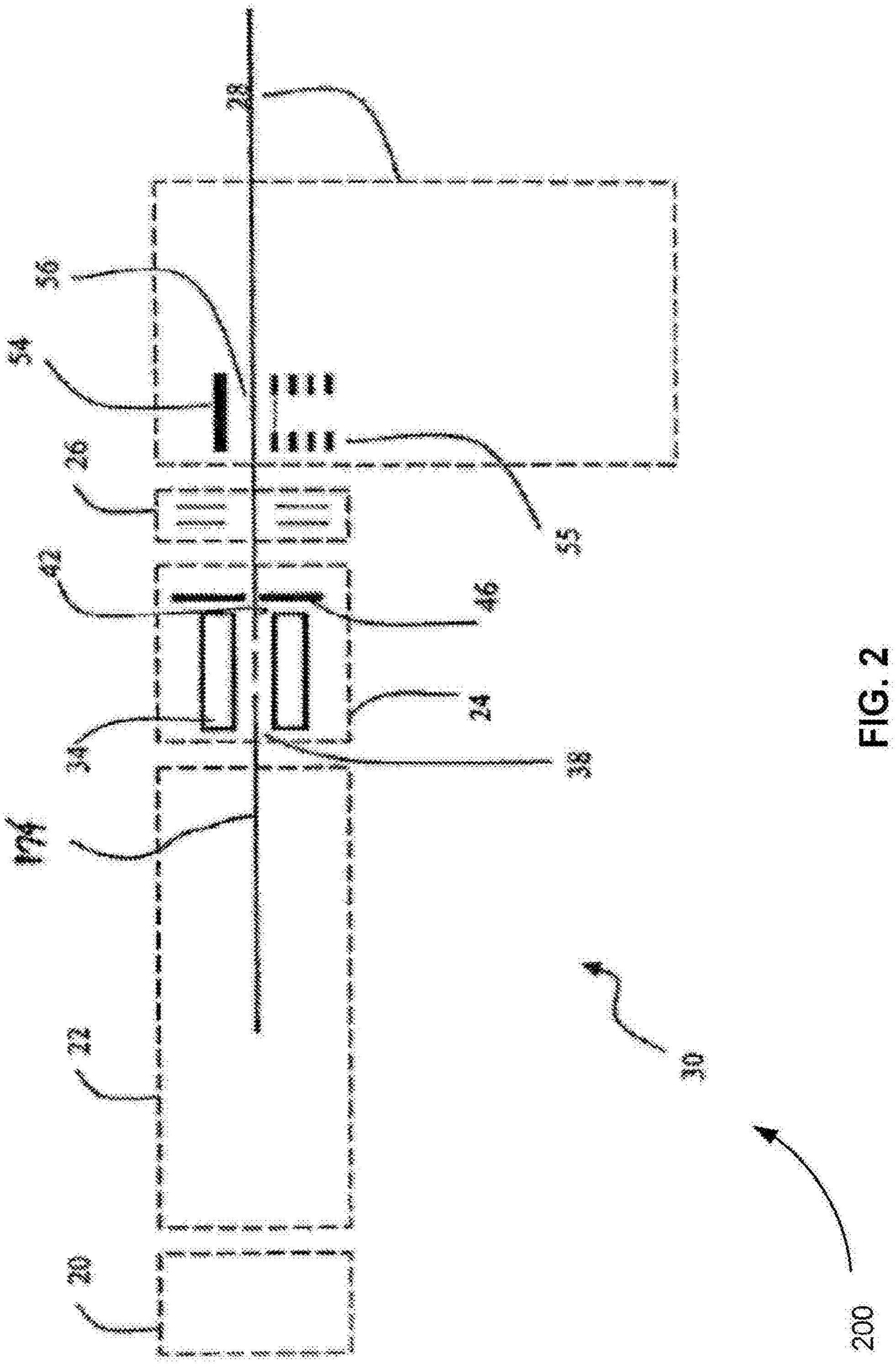
FIG. 2 (PRIOR ART)
FIG. 2 is an exemplary schematic diagram of a mass spectrometer.
Figure 3:
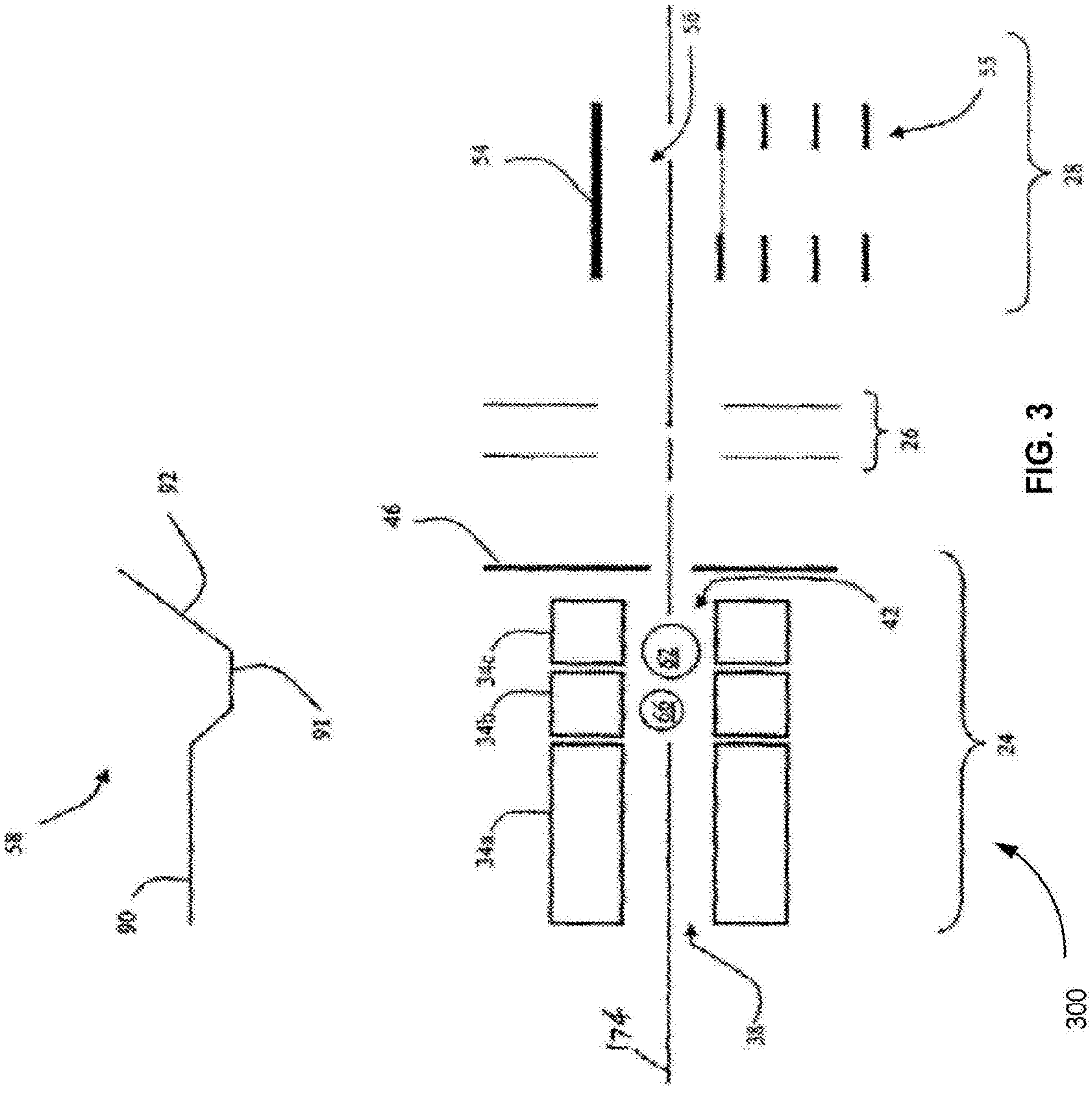
FIG. 3 (PRIOR ART)
FIG. 3 is an exemplary schematic diagram of the ion guide, electrostatic lens, and time-of-flight (TOF) mass analyzer of U.S. Pat. No. 7,456,388 (hereinafter the "'388 patent") along with an accumulation potential profile of the ion guide.
Figure 4:
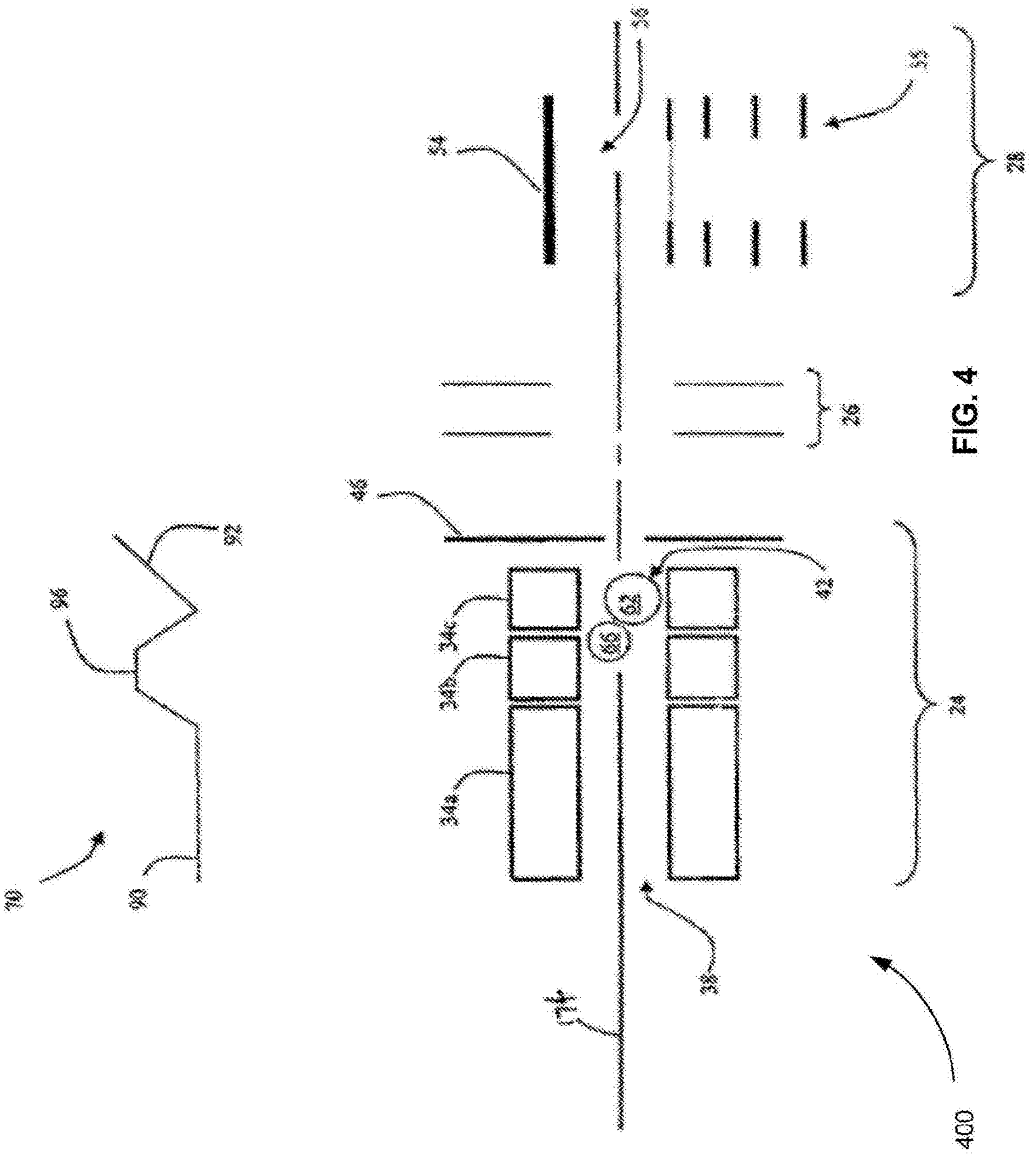
FIG. 4 (PRIOR ART)
FIG. 4 is an exemplary schematic diagram of the ion guide, electrostatic lens, and TOF mass analyzer of the '388 patent along with a pre-ejection potential profile of the ion guide.
Figure 5:
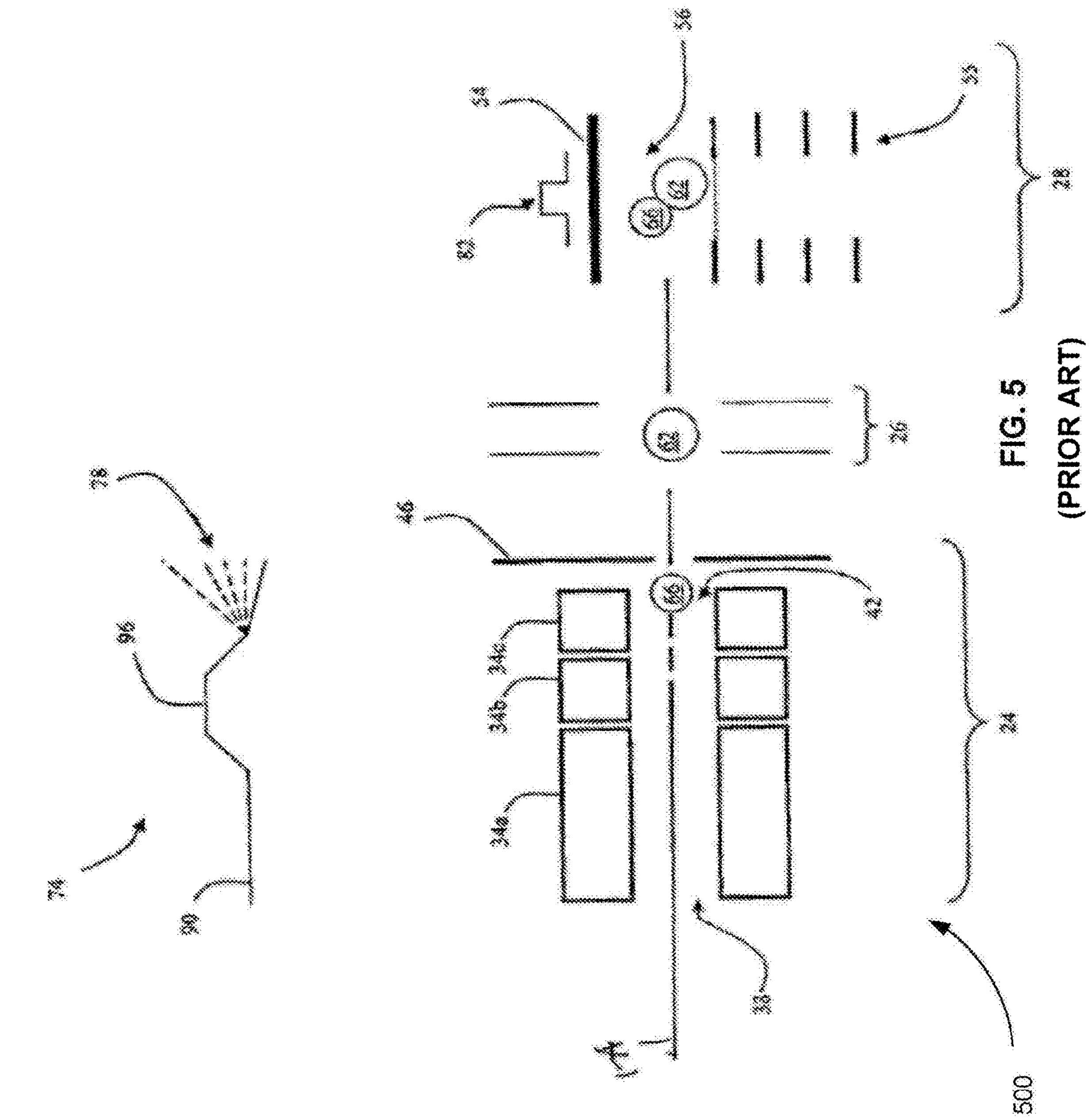
FIG. 5 (PRIOR ART)
FIG. 5 is an exemplary schematic diagram of the ion guide, electrostatic lens, and TOF mass analyzer of the '388 patent along with an ejection potential profile of the ion guide.
Figure 6:
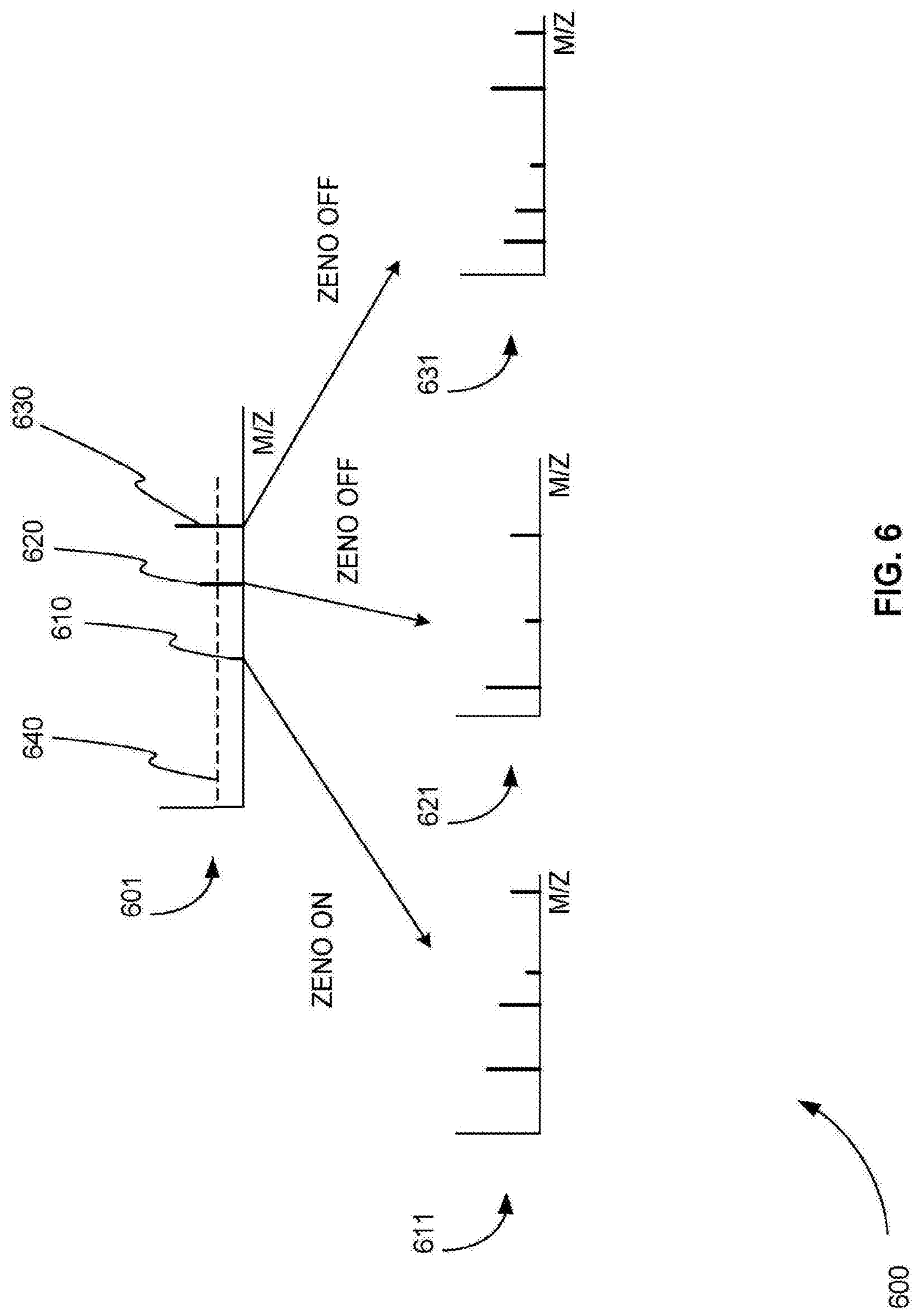
FIG. 6 (PRIOR ART)
FIG. 6 is an exemplary diagram showing the MS (precursor ion) spectra and MS/MS (product ion spectra) of an on demand IDA method of the paper entitled "A Novel Ion Trap That Enables High Duty Cycle and Wide m/z Range on an Orthogonal Injection TOF Mass Spectrometer" by Alexander V. Loboda and Igor V. Chernushevich published in the Journal of the American Society of Mass Spectrometry in July of 2009, vol. 20, no. 7, (hereinafter the "Loboda Paper").
Figure 7:
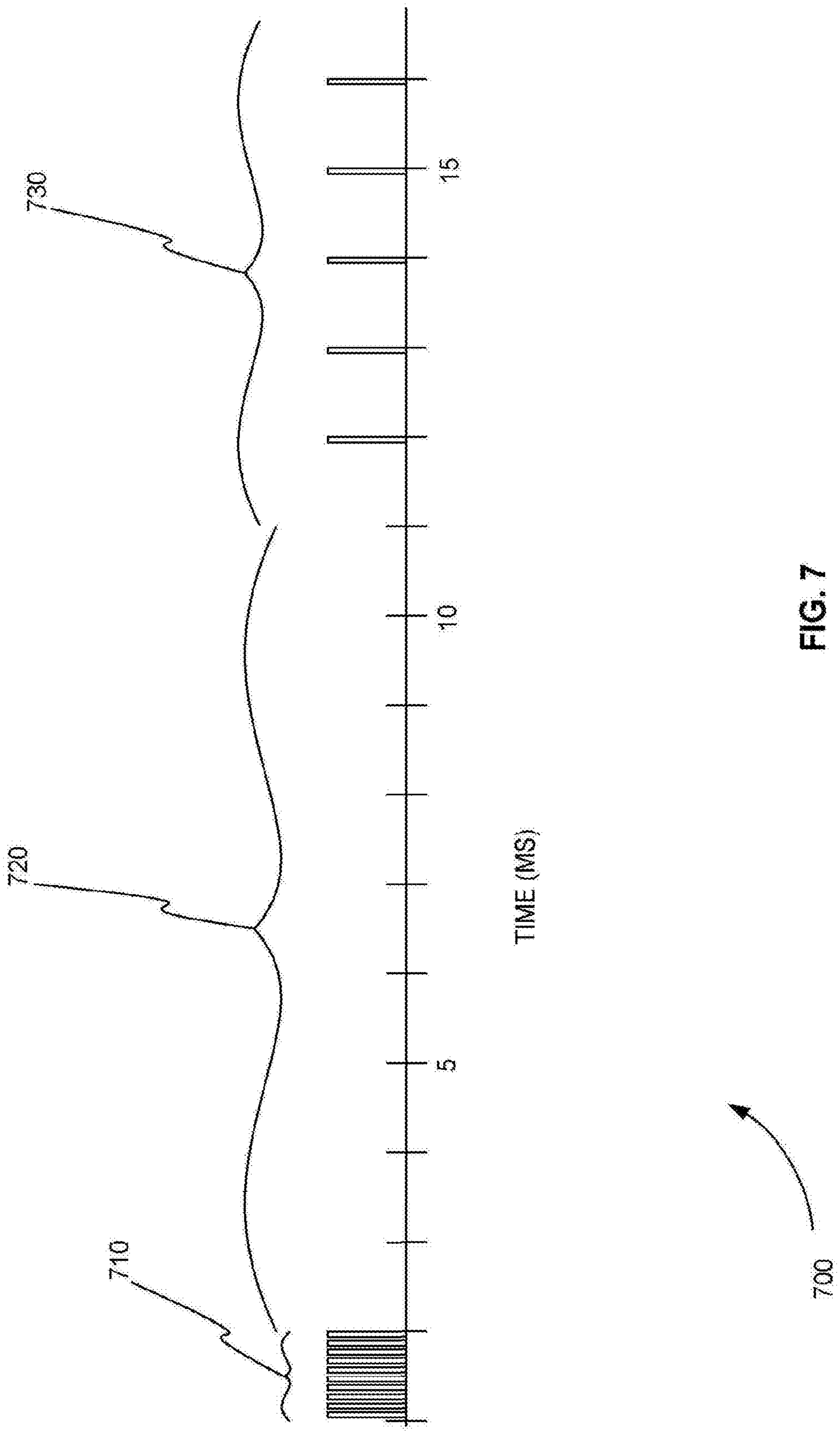
FIG. 7 (PRIOR ART)
FIG. 7 is an exemplary timing diagram showing the two different TOF extraction pulses of a TOF mass analyzer for normal pulsing mode and Zeno pulsing mode and the settle time needed for switching between the two modes.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106. Precursor ion mass selection media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Eliminating or Reducing AC Effects in Zeno Pulsing

As described above, U.S. Pat. No. 7,456,388 (hereinafter the "'388 patent") provides apparatus and methods that allow analysis of ions over broad m/z ranges with virtually no transmission losses. Specifically, an ion guide of the '388 patent traps ions before a TOF mass analyzer and ejects them sequentially according to their m/z so that all ions irrespective of their m/z arrive and are concentrated at an extraction region of the TOF mass analyzer at the same time.

The paper entitled "A Novel Ion Trap That Enables High Duty Cycle and Wide m/z Range on an Orthogonal Injection TOF Mass Spectrometer" by Alexander V. Loboda and Igor V. Chernushevich published in the Journal of the American Society of Mass Spectrometry in July of 2009, vol. 20, no. 7, (hereinafter the "Loboda Paper") refers to the sequential ejection of ions from an ion guide as Zeno pulsing. The Loboda Paper also suggests performing Zeno pulsing in an on demand mode in IDA acquisition experiments.

International Patent Application No. WO2019/198010 (hereinafter the "'010 application") describes systems and methods for switching between normal and Zeno pulsing modes in acquisition methods other than IDA. As described in the '010 application, the large gain in sensitivity produced by Zeno pulsing is obtained and saturation is avoided by dynamically switching between Zeno pulsing mode and normal pulsing mode within the same quantitative targeted acquisition experiment.

Figure 8:
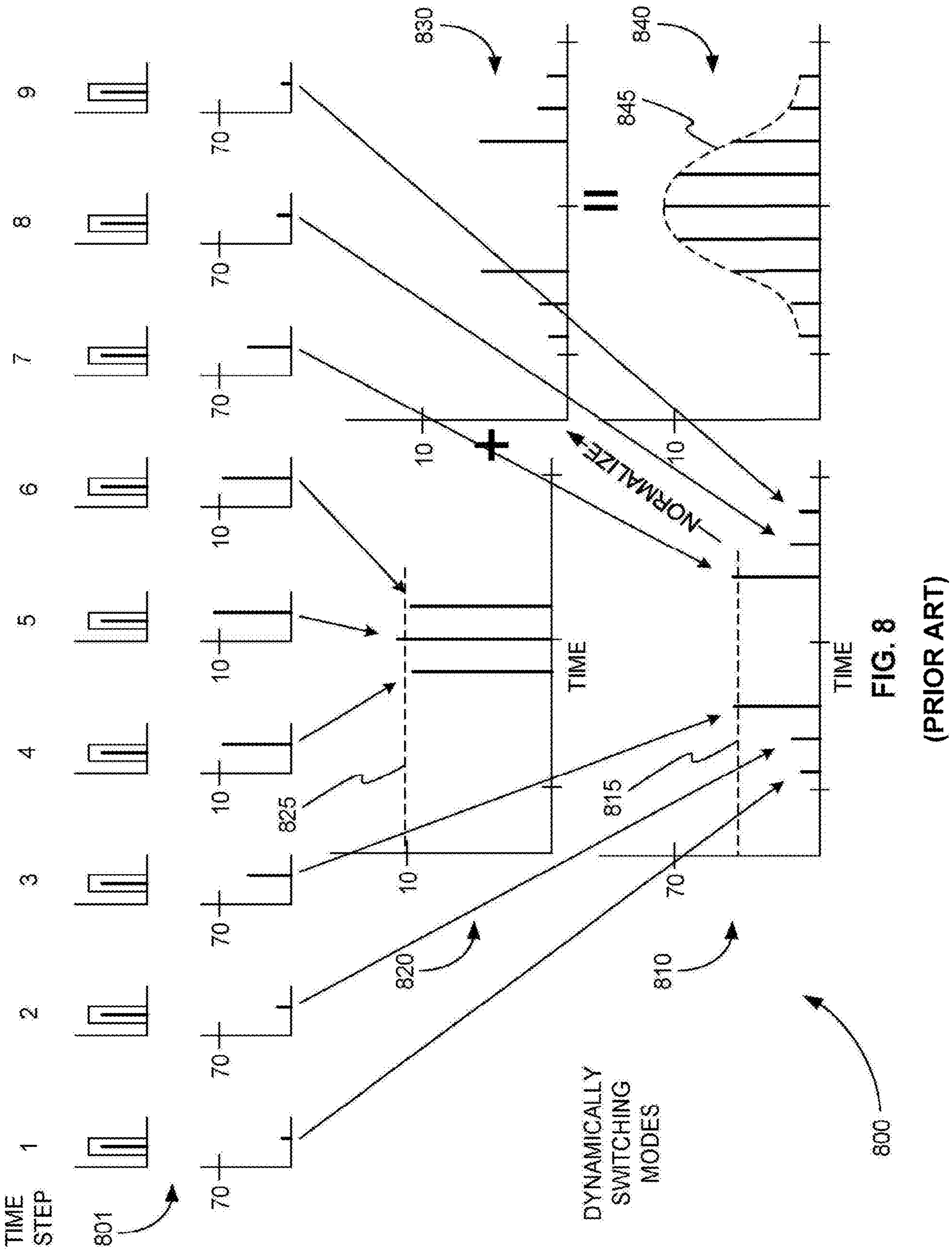
FIG. 8 (PRIOR ART)
FIG. 8 is an exemplary diagram showing how dynamic switching between Zeno pulsing mode and normal pulsing mode is used to obtain an XIC in a quantitative targeted acquisition method with increased sensitivity and without saturation.

As shown in FIG. 8, in LC-MS/MS quantitation experiments that apply dynamic switching between Zeno and normal pulsing modes, Zeno and non-Zeno data is stitched together to provide peaks used for quantitation. However, the predicted Zeno pulsing gain of Zeno data must be taken into account before adding the Zeno and non-Zeno data.

It was recently discovered that the actual Zeno pulsing gain can exceed the predicted Zeno pulsing gain by as much as six orders of magnitude for some compounds. This appears to be due to unexpected ion fragmentation, loss, or both fragmentation and loss as ions of these compounds enter the Zeno ion guide and encounter the AC voltage gradient. Such unpredictable Zeno pulsing gains can result in discontinuous stitching of XIC traces. This, in turn, can produce large quantitation errors.

As a result, systems and methods are needed to prevent unwanted ion fragmentation, loss, or both fragmentation and loss during Zeno pulsing in order to produce predictable Zeno pulsing gains for all compounds, when dynamically switching between Zeno and normal pulsing modes.

Figure 9:
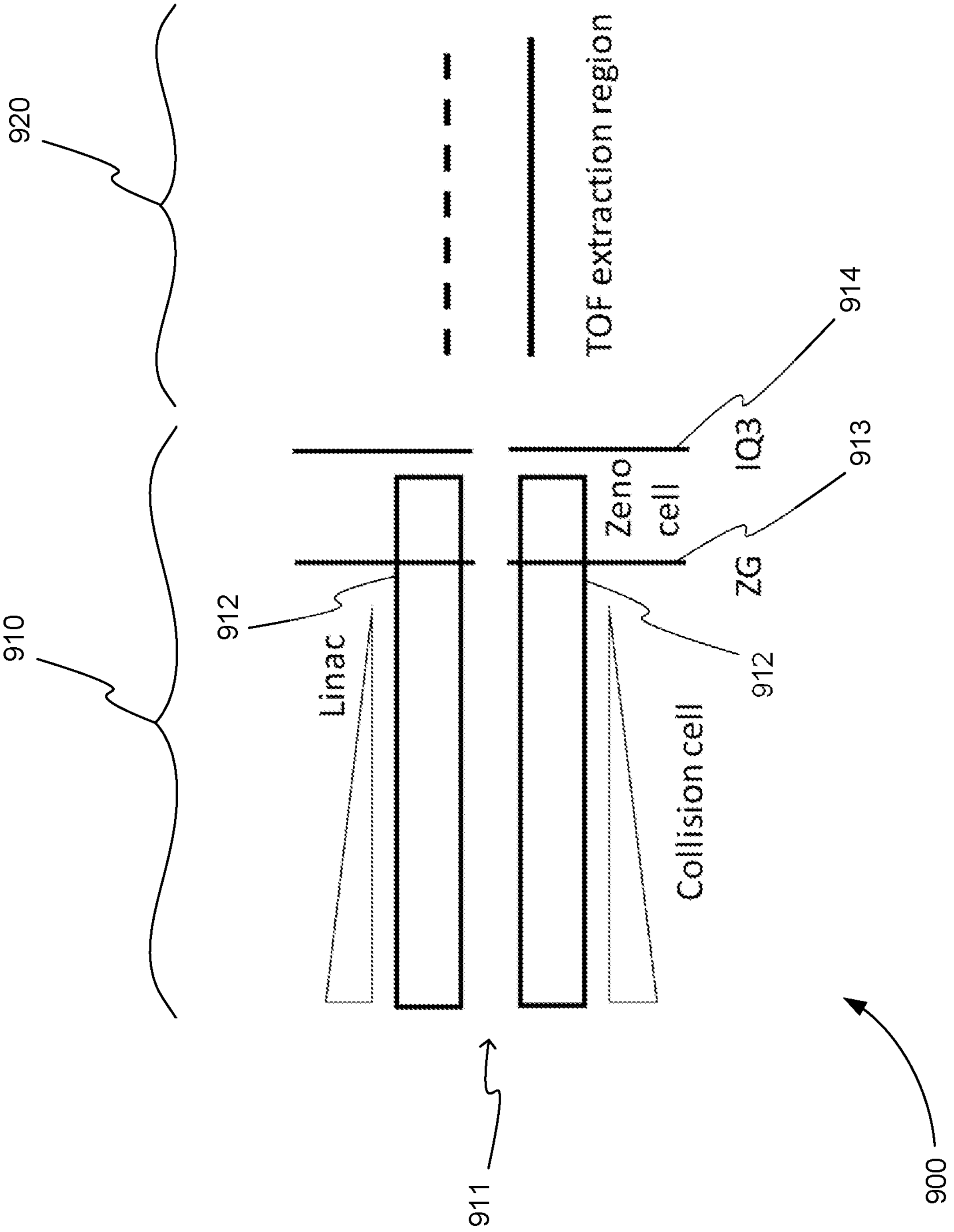
FIG. 9 is an exemplary schematic diagram showing a Zeno pulsing ion guide and a TOF extraction region, in accordance with various embodiments.

FIG. 9 is an exemplary schematic diagram 900 showing a Zeno pulsing ion guide and a TOF extraction region, in accordance with various embodiments. As described above, ion guide 910 traps ions before a TOF mass analyzer and ejects them sequentially according to their m/z so that all ions irrespective of their m/z arrive and are concentrated at extraction region 920 of the TOF mass analyzer at the same time. Ion guide 910 includes entrance aperture 911, ion guide rods or electrodes 912, Zeno gate (ZG) electrode 913, and IQ3 end cap or exit electrode 914.

Figure 10:
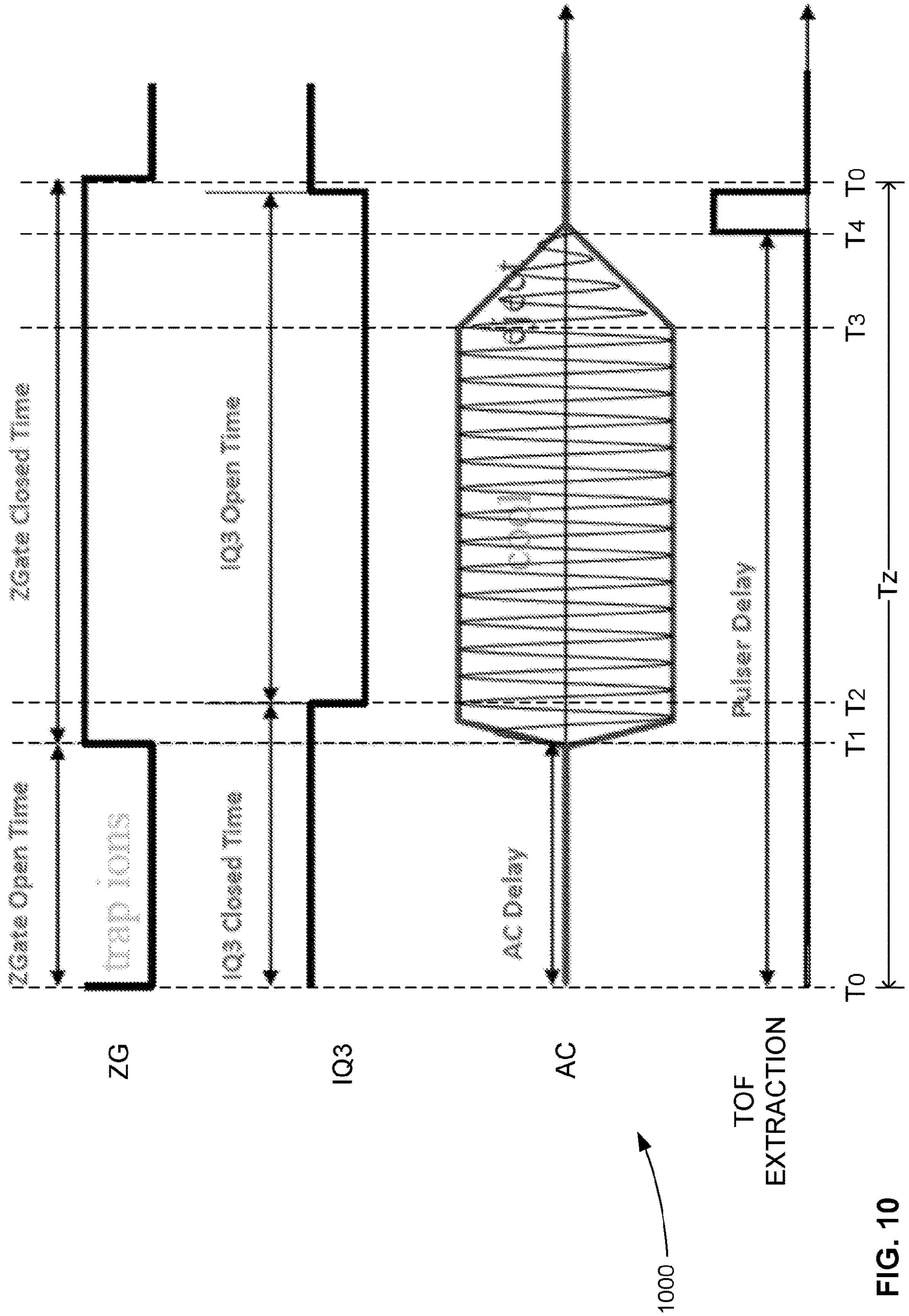
FIG. 10 is an exemplary timing diagram showing how direct current (DC) and alternating current (AC) voltages are traditionally applied to the Zeno pulsing ion guide and TOF extraction region of FIG. 9 in order to trap ions and sequentially eject them.

FIG. 10 is an exemplary timing diagram 1000 showing how DC and AC voltages are traditionally applied to the Zeno pulsing ion guide and TOF extraction region of FIG. 9 in order to trap ions and sequentially eject them. At time $T_0$, the Zeno cycle ($T_Z$) begins. Referring to FIG. 9, at $T_0$, the DC voltage at ZG electrode 913 is set low, the DC voltage at IQ3 electrode 914 remains high, the AC voltage on ion guide electrodes 912 remains off, and the pulse in extraction region 920 remains off. This allows the ions continually entering ion guide 910 through entrance aperture 911 to move into the Zeno cell between ZG electrode 913 and IQ3 electrode 914.

Returning to FIG. 10, at time $T_1$ of $T_Z$, ions are trapped and the AC voltage is started. Referring to FIG. 9, at $T_1$, the DC voltage at ZG electrode 913 is raised to trap ions in the Zeno cell between ZG electrode 913 and IQ3 electrode 914. In addition, the AC voltage on ion guide electrodes 912 is started.

Returning to FIG. 10, at time $T_2$ of $T_Z$, a short time after $T_1$, the exit aperture of the Zeno ion guide is opened. Referring to FIG. 9, at $T_2$, the DC voltage at IQ3 electrode 914 is set low, opening the exit of ion guide 910. However, the ions in the Zeno cell between ZG electrode 913 and IQ3 electrode 914 remain trapped. These ions remain trapped and are allowed to cool due to the AC voltage on ion guide electrodes 912.

Returning to FIG. 10, at time $T_3$ of $T_Z$, the AC voltage is ramped to eject ions sequentially based on m/z value. Referring to FIG. 9, at $T_3$, the amplitude of the AC voltage on ion guide electrodes 912 is ramped to eject the ions of the Zeno cell between ZG electrode 913 and IQ3 electrode 914 through IQ3 electrode 914 to extraction region 920.

Returning to FIG. 10, at time $T_4$ of $T_Z$, the AC voltage is turned off and ions are pulsed in the mass analyzer. Referring to FIG. 9, at $T_4$, the AC voltage on ion guide electrodes 912 is set low and the ejected ions in extraction region 920 of the mass analyzer are pulsed in the mass analyzer. After the pulse in extraction region 920, the DC voltage at IQ3 electrode 914 is raised to prevent the release of ions from ion guide 910. Shortly thereafter the Zeno cycle begins again with the reduction of the DC voltage at ZG electrode 913.

Returning to FIG. 10, note that traditionally in Zeno pulsing the AC voltage is applied as soon as the Zeno cell is filled and closed. Consequently, the AC voltage is used to both trap and cool the ions in the Zeno cell before they are released. Unfortunately, as described above, this long duration of the AC voltage can cause ions that continue to enter the Zeno ion guide throughout the entire time $T_Z$ to experience fragmentation, loss, or both fragmentation and loss while the AC voltage is applied. In other words, applying an AC voltage in a Zeno ion guide while ions are moving into the Zeno ion guide can cause fragmentation, loss, or both fragmentation and loss.

As a result, in various embodiments, systems and methods are provided to eliminate or reduce the amount of time an AC voltage is applied in a Zeno ion guide while ions are moving toward or into the Zeno ion guide.

Eliminating AC Effects Through Pre-Trapping

In various embodiments, an additional ion trap is placed before a Zeno ion guide to prevent ions from being injected into the Zeno ion guide while an AC voltage is applied in a Zeno ion guide. The additional ion trap allows ions from the continuous flow of an ion beam to be buffered or trapped while the AC voltage of the Zeno guide is on. As a result, the throughput of the system is maintained. Because no ions are injected into the Zeno ion guide while the AC voltage is applied in a Zeno ion guide, ion fragmentation or loss is eliminated.

Figure 11:
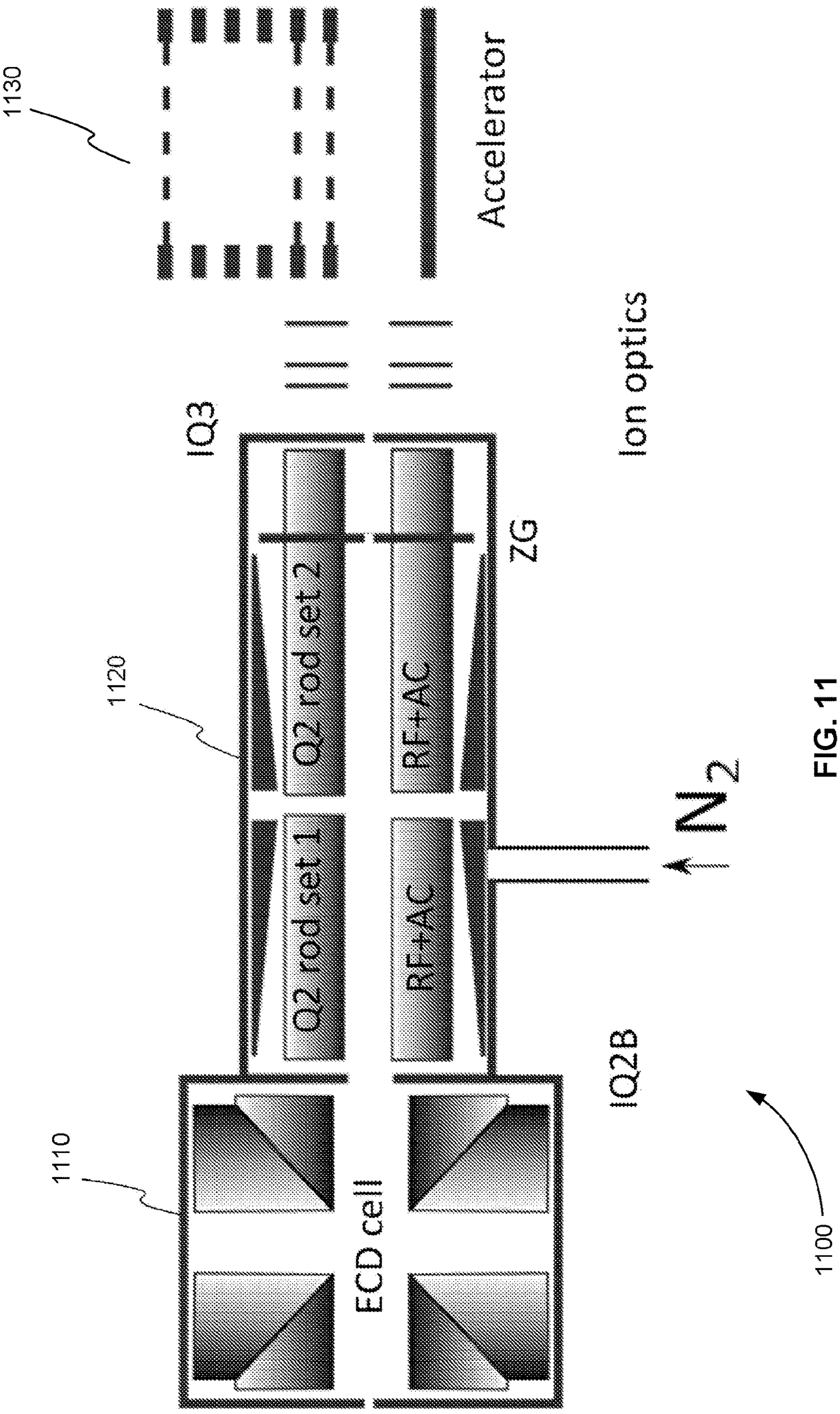
FIG. 11 is an exemplary schematic diagram showing a system for pre-trapping ions before an ion guide that sequentially ejects ions according to m/z values using an AC voltage in order to prevent ions from being injected into the ion guide while the AC voltage is on, in accordance with various embodiments.

FIG. 11 is an exemplary schematic diagram 1100 showing a system for pre-trapping ions before an ion guide that sequentially ejects ions according to m/z values using an AC voltage in order to prevent ions from being injected into the ion guide while the AC voltage is on, in accordance with various embodiments. The system of FIG. 11 includes ion trap 1110, ion guide 1120, and region 1130 of a mass analyzer.

In FIG. 11, ion trap 1110 and ion guide 1120 are shown as parts of a single device. This single device is a “Chimera” ECD device, produced by SCIEX of Framingham, MA. The Chimera ECD device includes ECD cell 1110 and CID cell 1120. Ion guide 1120 is, therefore, shown as a CID cell that is modified for Zeno pulsing. As a result, FIG. 11 shows that dissociation can also be performed in ion trap 1110 or ion guide 1120.

Ion trap 1110, however, is not limited to the Chimera ECD device of FIG. 11 and can be any type of ion trap, including, but not limited to, a linear ion trap, an electrostatic linear ion trap (ELIT), an ExD device, a Fourier transform ion cyclotron resonance (FT-ICR) device, or an orbitrap. Similarly, ion guide 1120 is not limited to the CID cell of FIG. 11 and can be any type of ion guide capable of Zeno pulsing.

In FIG. 11, region 1130 is shown as an extraction region of a TOF mass analyzer, for example. Region 1130, however, can be any region of another device where it is advantageous to concentrate ions with different m/z values at the same time. For example, U.S. Provisional Patent Application No. 62/779,372 is directed to using Zeno pulsing to inject ions into an electrostatic linear ion trap (ELIT). This allows ions with different m/z values to be focused at the same location at the same time in the ELIT to increase the m/z range of the ELIT and to prevent positional dependencies in the measured ion intensities.

Ion trap 1110, ion guide 1120, and extraction region 1130 are operated to prevent ions from being injected into ion guide 1120 while the AC voltage in ion guide 1120 is on.

Figure 12:
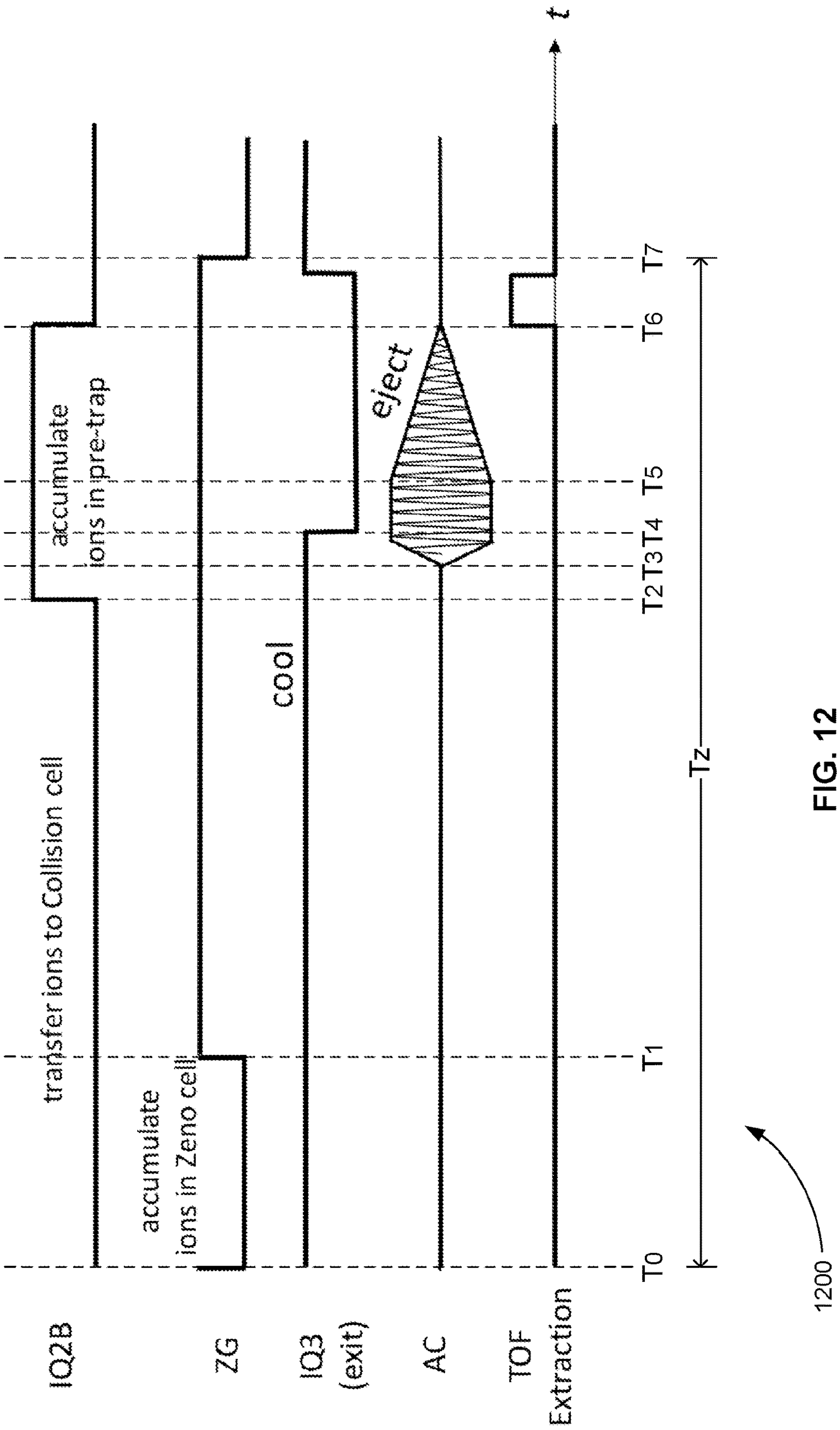
FIG. 12 is an exemplary timing diagram that shows how the system of FIG. 11 is operated to prevent ions from being injected into the ion guide of the system while the AC voltage in the ion guide is on, in accordance with various embodiments.

FIG. 12 is an exemplary timing diagram 1200 that shows how the system of FIG. 11 is operated to prevent ions from being injected into the ion guide of the system while the AC voltage in the ion guide is on, in accordance with various embodiments. At time $T_0$, the Zeno cycle ($T_Z$) begins.

Figure 13:
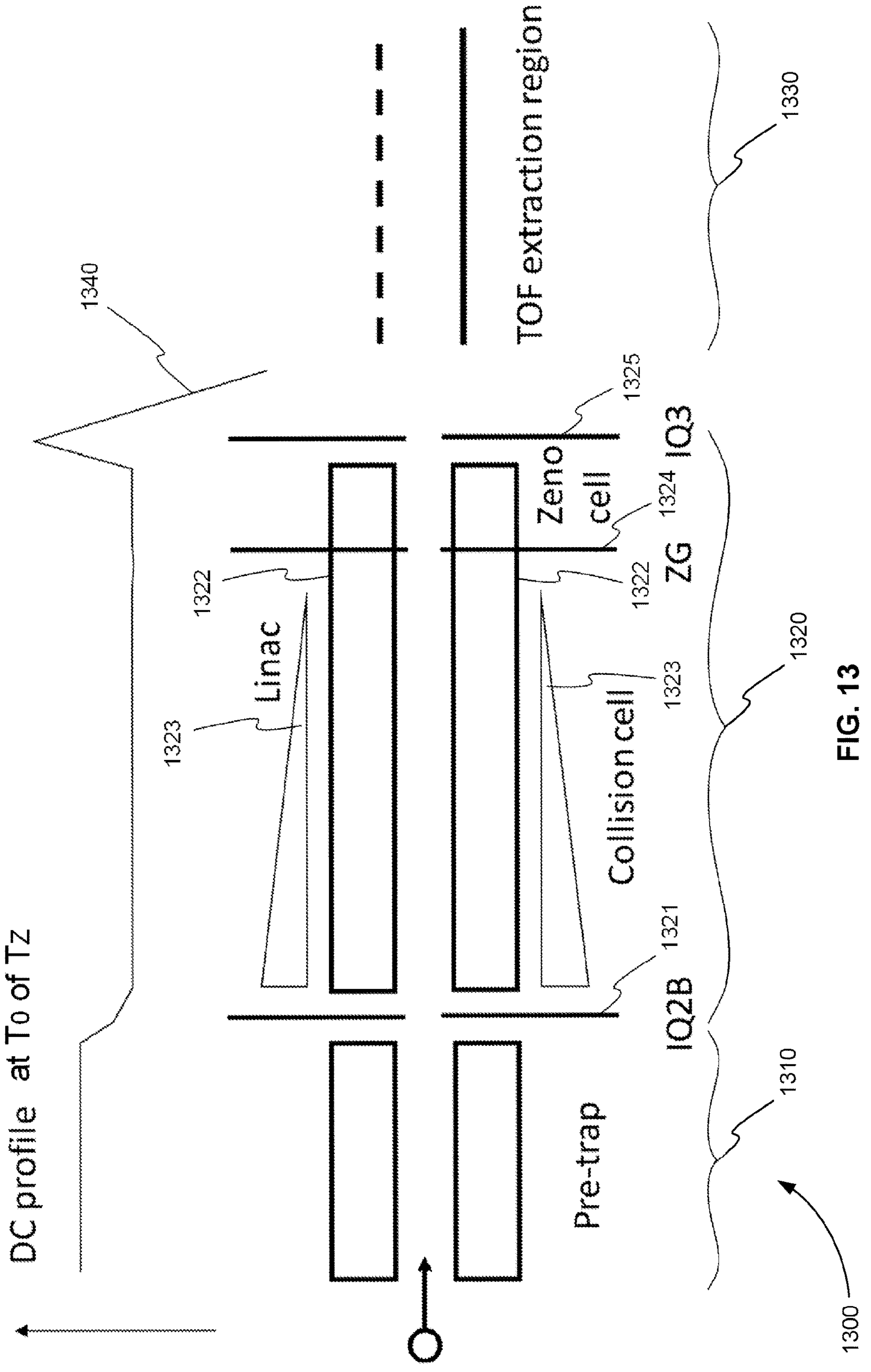
FIG. 13 is an exemplary schematic diagram showing a simplified version of the system of FIG. 11 for pre-trapping ions before an ion guide that sequentially ejects ions according to m/z values using an AC voltage and showing the electric field profile applied to the system to inject ions into the ion guide and its Zeno cell, in accordance with various embodiments.

FIG. 13 is an exemplary schematic diagram 1300 showing a simplified version of the system of FIG. 11 for pre-trapping ions before an ion guide that sequentially ejects ions according to m/z values using an AC voltage and showing the electric field profile applied to the system to inject ions into the ion guide and its Zeno cell, in accordance with various embodiments. As described above, pre-trap or ion trap 1310, ion guide 1320, and extraction region 1330 are operated to prevent ions from being injected into ion guide 1320 while the AC voltage in ion guide 1320 is on. Ion guide 1320 includes IQ2B entrance electrode 1321, ion guide rods or electrodes 1322, linear particle accelerator (LINAC) electrodes 1323, Zeno gate (ZG) electrode 1324 and IQ3 end cap or exit electrode 1325.

At time $T_0$ of Zeno cycle $T_Z$, the system of FIG. 13 is operated to allow ion trap 1310 to inject ions into ion guide 1320 and its Zeno cell located between ZG electrode 1324 and IQ3 electrode 1325. As shown by electric field profile 1340, at $T_0$, the DC voltage at IQ2B electrode 1321 remains low, the DC voltage at ZG electrode 1324 is set low, the DC voltage at IQ3 electrode 1325 remains high, the AC voltage on ion guide electrodes 1322 remains off, and the pulse in extraction region 1330 remains off. This allows the ions continually entering ion guide 1320 through IQ2B electrode 1321 to move into the Zeno cell between ZG electrode 1324 and IQ3 electrode 1325.

IQ2B electrode 1321 transfers ions to ion guide 1320 when low, and accumulates them in ion trap 1310 when high. ZG electrode 1324 is open for only a short time because ions need to be cooled in the Zeno cell between ZG electrode 1324 and IQ3 electrode 1325.

Returning to FIG. 12, the IQ2B electrode is set low for the time period $(T_2-T_0)+(T_7-T_6)$ (e.g., ~400 μs) and is set high for the time period $T_6-T_2$ (e.g., ~270 μs). The ZG electrode is open for the time period $T_1-T_0$ (e.g., ~100 μs, a fraction of the IQ2B electrode open time).

At time $T_1$ of $T_Z$, the ZG electrode is closed trapping ions in the Zeno cell. However, ions continue to be transferred to the Zeno ion guide.

Figure 14:
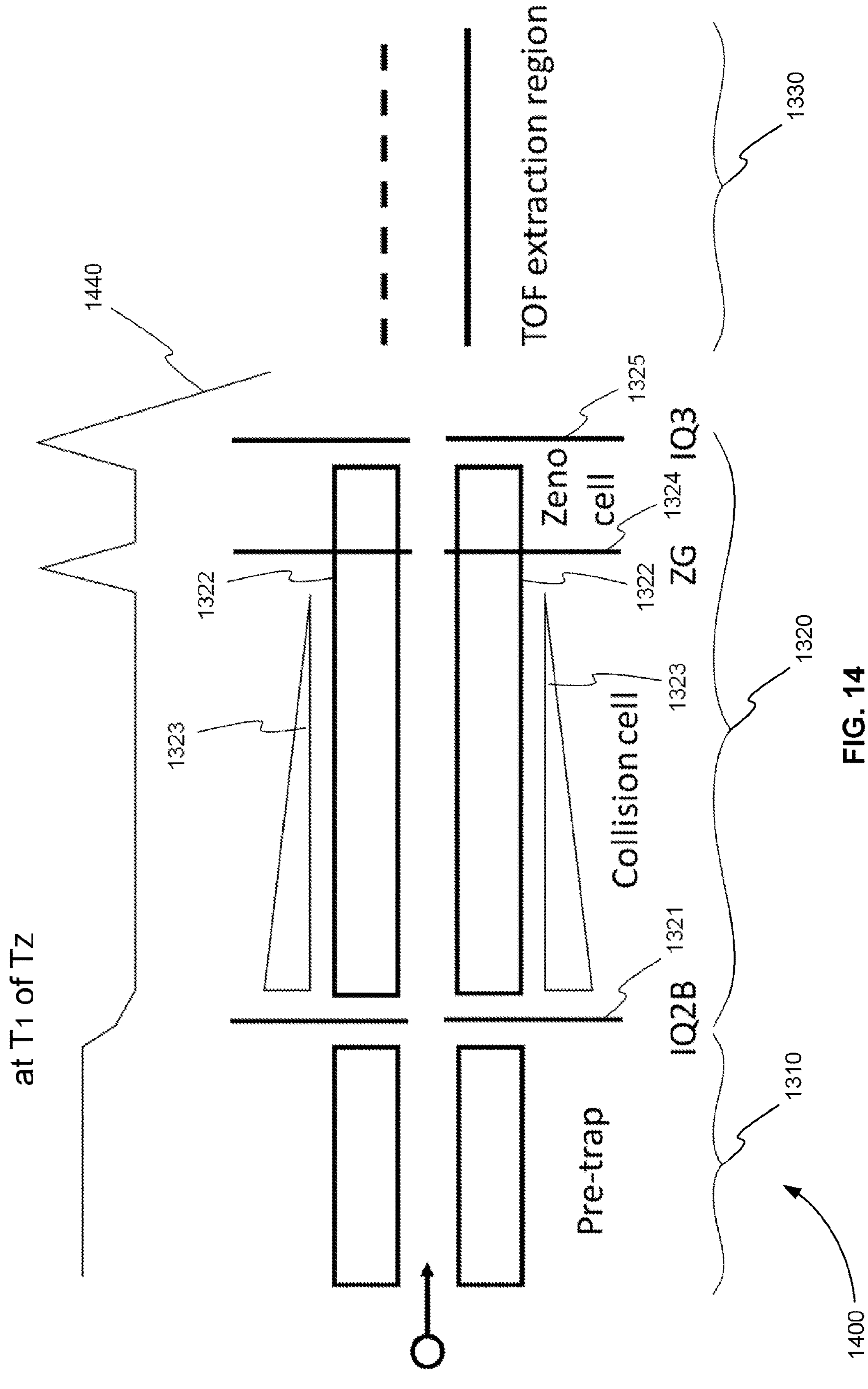
FIG. 14 is an exemplary schematic diagram showing the system of FIG. 13 and showing the electric field profile applied to the system to continue to move ions from the ion trap to the ion guide while cooling ions trapped in the Zeno cell of the ion guide, in accordance with various embodiments.

FIG. 14 is an exemplary schematic diagram 1400 showing the system of FIG. 13 and showing the electric field profile applied to the system to continue to move ions from the ion trap to the ion guide while cooling ions trapped in the Zeno cell of the ion guide, in accordance with various embodiments. As shown by electric field profile 1440, at $T_1$, the DC voltage at ZG electrode 1324 is raised trapping ions in the Zeno cell between ZG electrode 1324 and IQ3 electrode 1325.

Those ions that do not make it into the Zeno cell because ZG electrode 1324 is already closed are trapped right before ZG electrode 1324 until the next cycle. Transfer of ions from IQ2B electrode 1321 to ZG electrode 1324 takes a millisecond or more, so it may take a few cycles to get ions into the Zeno cell. What is important is that no ions are lost. LINAC electrodes 1323 are used to speed up ion transfer from IQ2B electrode 1321 to ZG electrode 1324 and to keep ions trapped close to ZG electrode 1324.

Returning to FIG. 12, at time $T_2$ of $T_Z$, the IQ2B electrode is set high ending the transfer of ions from the ion trap into the ion guide. The IQ2B electrode is set high to stop all ion transfers to the ion guide before the AC voltage is applied. This eliminates any unwanted effects from the AC voltage.

In the time period $T_2-T_1$, ions trapped in the Zeno cell are cooled while ions continue to be transferred from the ion trap to the ion guide. This cooling time period is created by changing the DC voltages of the IQ2B electrode and the ZQ electrode. This allows the time period of the AC voltage, $T_6-T_3$, to be reduced. In other words, the AC voltage is not used to cool the ions trapped in the Zeno cell. A comparison of FIG. 12 with FIG. 10 shows that traditional Zeno pulsing has no time period similar to the time period $T_2-T_1$ of FIG. 12 for cooling ions in the Zeno cell using DC voltages.

Figure 15:
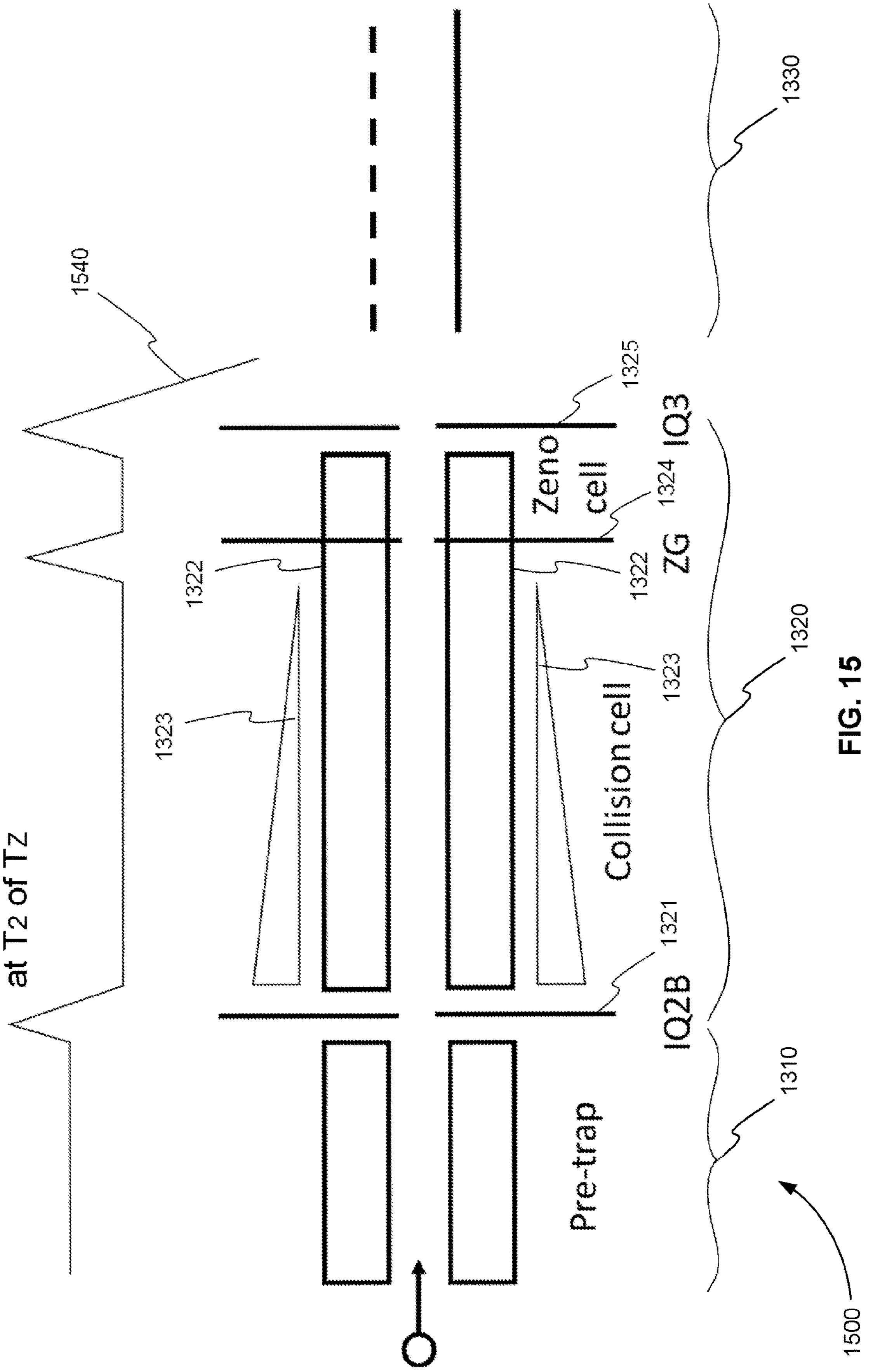
FIG. 15 is an exemplary schematic diagram showing the system of FIG. 13 and showing the electric field profile applied to the system to stop the movement of ions from the ion trap to the ion guide in preparation for the application of AC voltage, in accordance with various embodiments.

FIG. 15 is an exemplary schematic diagram 1500 showing the system of FIG. 13 and showing the electric field profile applied to the system to stop the movement of ions from the ion trap to the ion guide in preparation for the application of AC voltage, in accordance with various embodiments. As shown by electric field profile 1540, at $T_2$, the DC voltage at IQ2B electrode 1321 is raised to stop the movement of ions from ion trap 1310 to ion guide 1320.

Returning to FIG. 12, at time $T_3$ of $T_Z$, a short time after the IQ2B electrode is closed, the AC voltage is initially applied to the electrode rods of the ion guide. The delay $T_3-T_2$ ensures that the IQ2B electrode is closed before the AC voltage is started.

At time $T_4$ of $T_Z$, a short time after the AC voltage is started, the IQ3 electrode is opened. The delay $T_4-T_3$ ensures that the AC voltage is fully on and capable of continuing to trap ions in the Zeno cell before the IQ3 electrode is opened. In other words, the IQ3 electrode keeps ions trapped using a DC voltage until the AC voltage is fully on. The DC trapping is then replaced by AC pseudopotential trapping. The IQ3 electrode is set high for the time period $T_4-T_0$ (e.g., ~450 μs) to maintain DC trapping.

At time $T_5$ of $T_Z$, the amplitude of the AC voltage is ramped, as described above, to sequentially eject ions. The AC voltage is held constant for the short time period $T_5-T_4$ (e.g., ~40 μs). This time period is short compared to the time period of constant AC voltage in FIG. 10 because the AC voltage is no longer being used to trap the ions in the Zeno for the cooling period.

Figure 16:
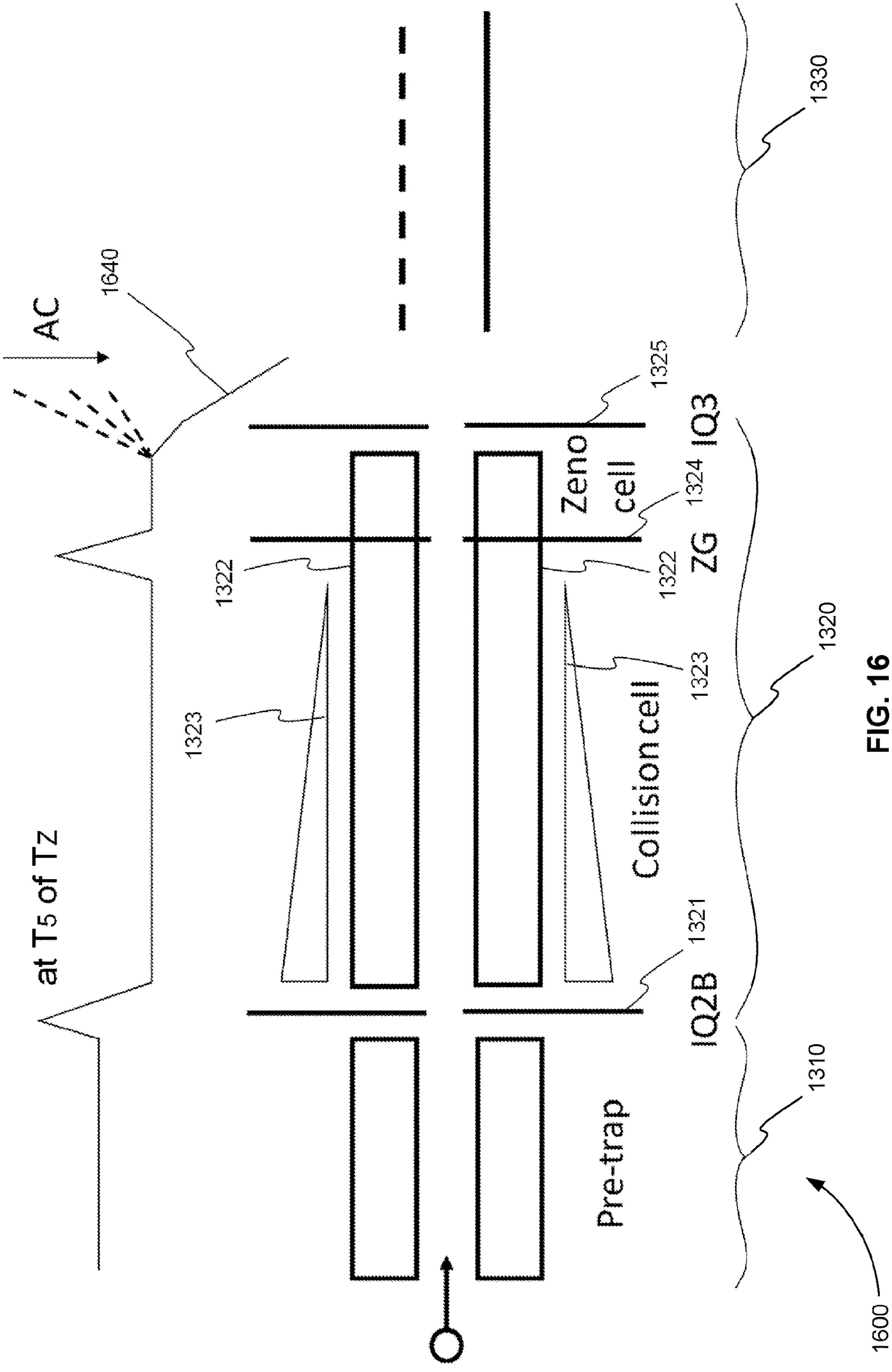
FIG. 16 is an exemplary schematic diagram showing the system of FIG. 13 and showing the electric field profile applied to the system to sequentially eject from the ion guide based on m/z value using a ramped AC voltage, in accordance with various embodiments.

FIG. 16 is an exemplary schematic diagram 1600 showing the system of FIG. 13 and showing the electric field profile applied to the system to sequentially eject from the ion guide based on m/z value using a ramped AC voltage, in accordance with various embodiments. As shown by electric field profile 1640, at $T_5$, the AC voltage on ion guide electrodes 1322 is ramped to sequentially eject ions from ion guide 1320 to extraction region 1330 by m/z value.

Returning to FIG. 12, at time $T_6$ of $T_Z$, the AC voltage ramp is ended. Also, at this time, a TOF extraction pulse is initiated by the mass analyzer. Shortly after the extraction pulse, at time $T_7$ of $T_Z$, the Zeno cycle begins again. Each Zeno cycle, $T_Z$, is repeated, for example, every 667 μs (or with a frequency of 1.5 kHz).

Figure 17:
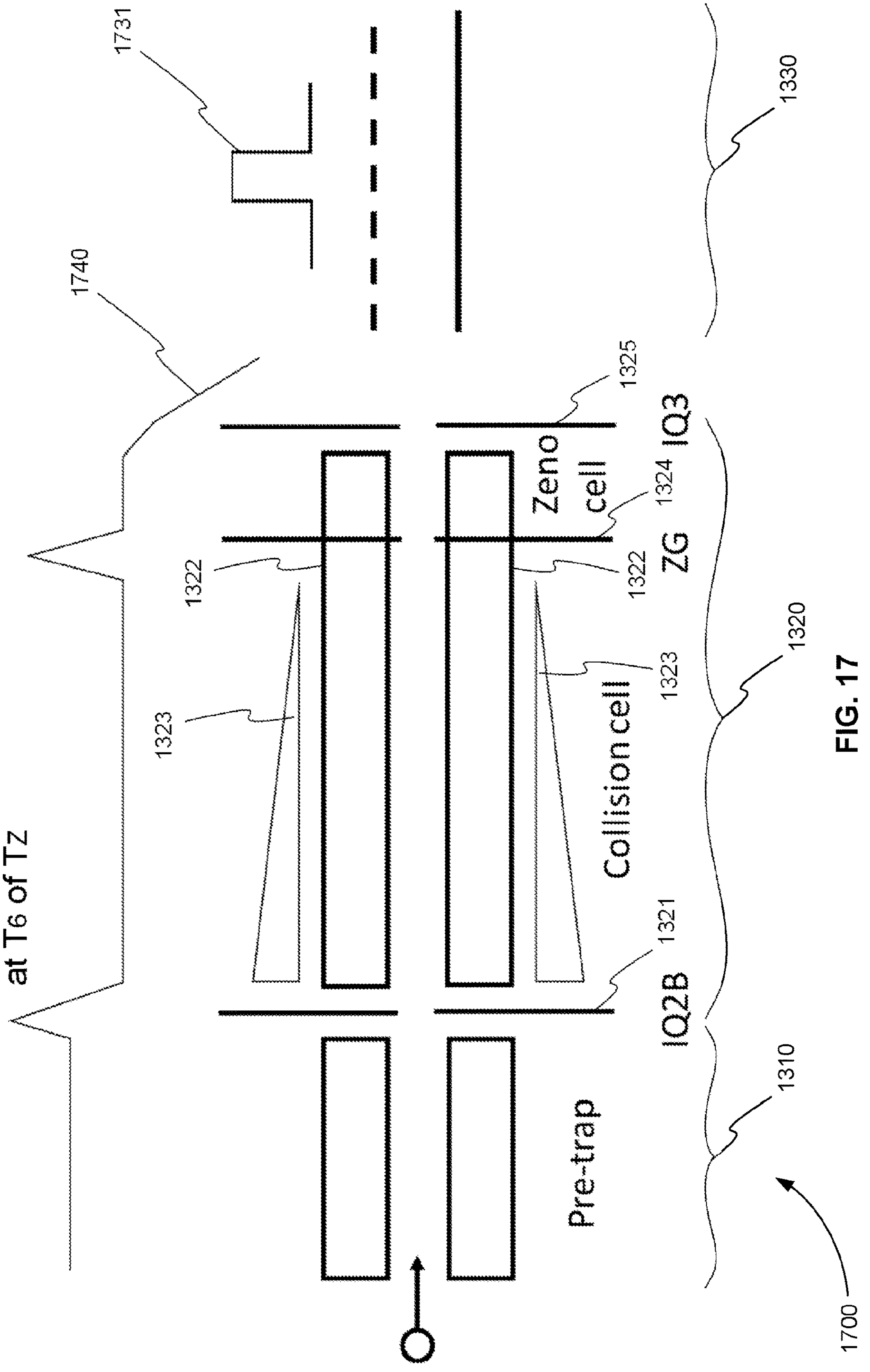
FIG. 17 is an exemplary schematic diagram showing the system of FIG. 13 and showing the electric field profile applied to the system at the end of AC voltage ramp and the beginning of the extraction pulse in the extraction region, in accordance with various embodiments.

FIG. 17 is an exemplary schematic diagram 1700 showing the system of FIG. 13 and showing the electric field profile applied to the system at the end of AC voltage ramp and the beginning of the extraction pulse in the extraction region, in accordance with various embodiments. As shown by electric field profile 1740, at $T_6$, the AC voltage ramped on ion guide electrodes 1322 is ended and pulse 1731 is initiated in extraction region 1330.

Figure 18:
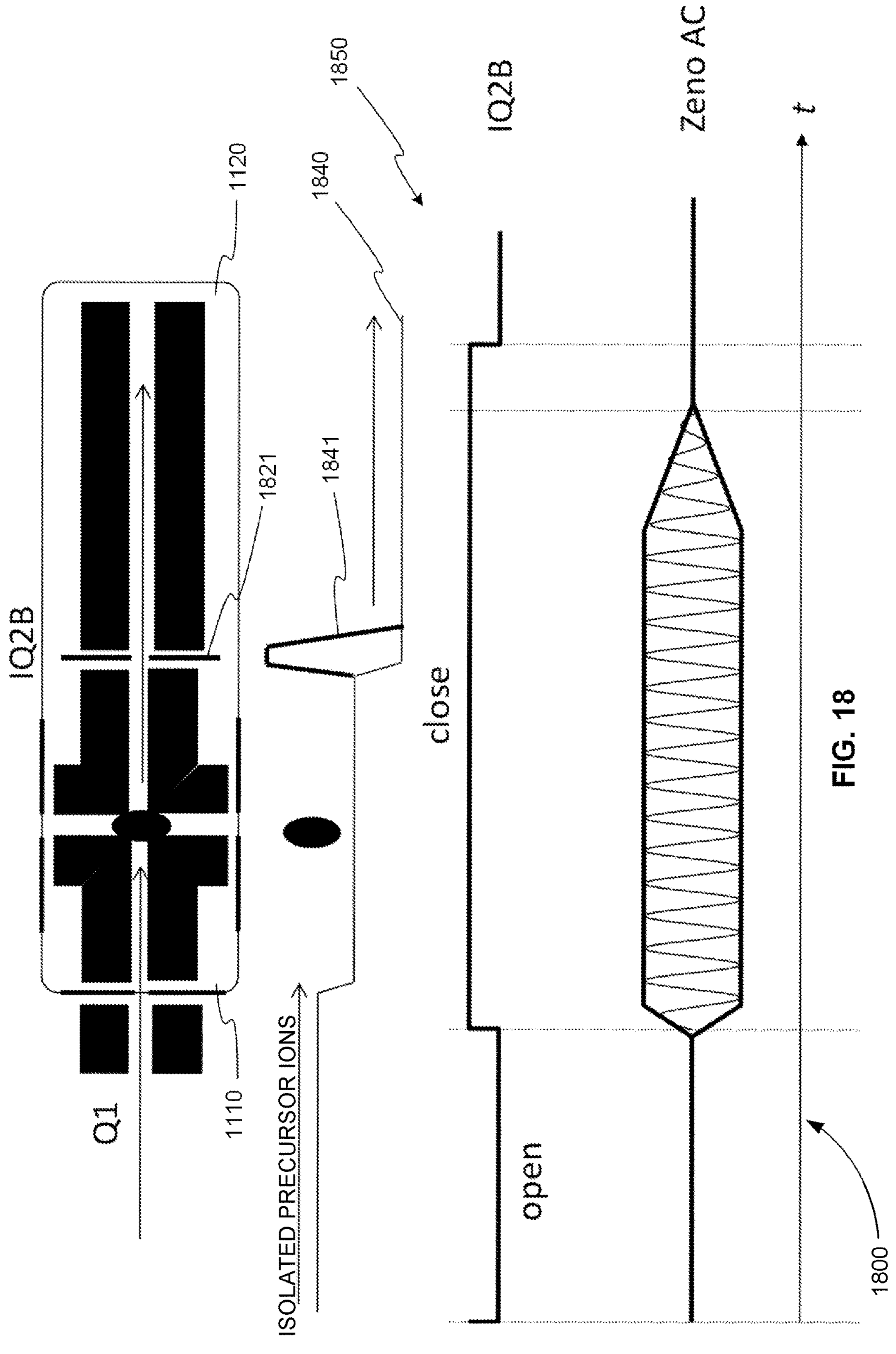
FIG. 18 is an exemplary schematic diagram showing the system of FIG. 11, an electric field profile across the system during pre-trapping, and a timing diagram showing how the pre-trap is closed while the AC voltage is applied, in accordance with various embodiments.

FIG. 18 is an exemplary schematic diagram 1800 showing the system of FIG. 11, an electric field profile across the system during pre-trapping, and a timing diagram showing how the pre-trap is closed while the AC voltage is applied, in accordance with various embodiments. Ion trap 1110 and ion guide 1120 of FIG. 11 are shown again in FIG. 18 to illustrate the pre-trapping of ions. As shown in electric field profile 1840, isolated precursor ions, for example, are injected into ion trap 1110. The ions are trapped in ion trap 1110 due to the voltage applied to IQ2B electrode 1821. Electric field profile 1840 shows electric field barrier 1841 created by the voltage applied to IQ2B electrode 1821. Electric field barrier 1841 is applied to trap the ions in ion trap 1110.

Timing diagram 1850 shows that the voltage applied to IQ2B electrode 1821 is applied when the AC voltage is on. In other words, the ions are trapped in ion trap 1110 when the AC voltage is on. Note that FIG. 18 shows that the closing of IQ2B electrode 1821 and the start of the AC voltage coincide. As described above, however, in relation to FIG. 12, IQ2B electrode 1821 can be closed before the AC voltage is started to ensure that no ions are affected by the AC voltage.

In the Zeno cycle, the AC voltage is applied only during a certain period of the full Zeno cycle, i.e., during ion ejection from the Zeno trap. If ions are prevented from reaching the edges of any traps created during the period when the AC voltage is on, the ions do not experience a detrimental potential or AC gradient, which can lead to unexpected fragmentation, loss, or fragmentation and loss.

As shown in FIG. 17, the ions are pulsed in a mass analyzer in sync with the Zeno cycle and only when the AC voltage is turned off. In the non-limiting example in FIG. 18, an ECD trap 1110 is used to pre-trap ions before ion guide 1120 and inject them into ion guide 1120 when the Zeno AC voltage is off. An advantageous but not necessary feature of ECD trap 1110 is that it is held under relatively high pressure 1-10 mTorr, which helps to store ions.

Returning to FIG. 12, note that by pre-trapping ions the AC voltage may also be used to cool ions. However, as FIG. 12 shows, if the time that the AC voltage is on is increased, the amount of time, $T_2-T_0$, to transfer ions into the ion guide is reduced. This time is reduced because the IQ2B electrode must be on and blocking ion transfer when the AC voltage is on. Consequently, in a preferred embodiment, the AC voltage is no longer used to cool ions.

Figure 19:
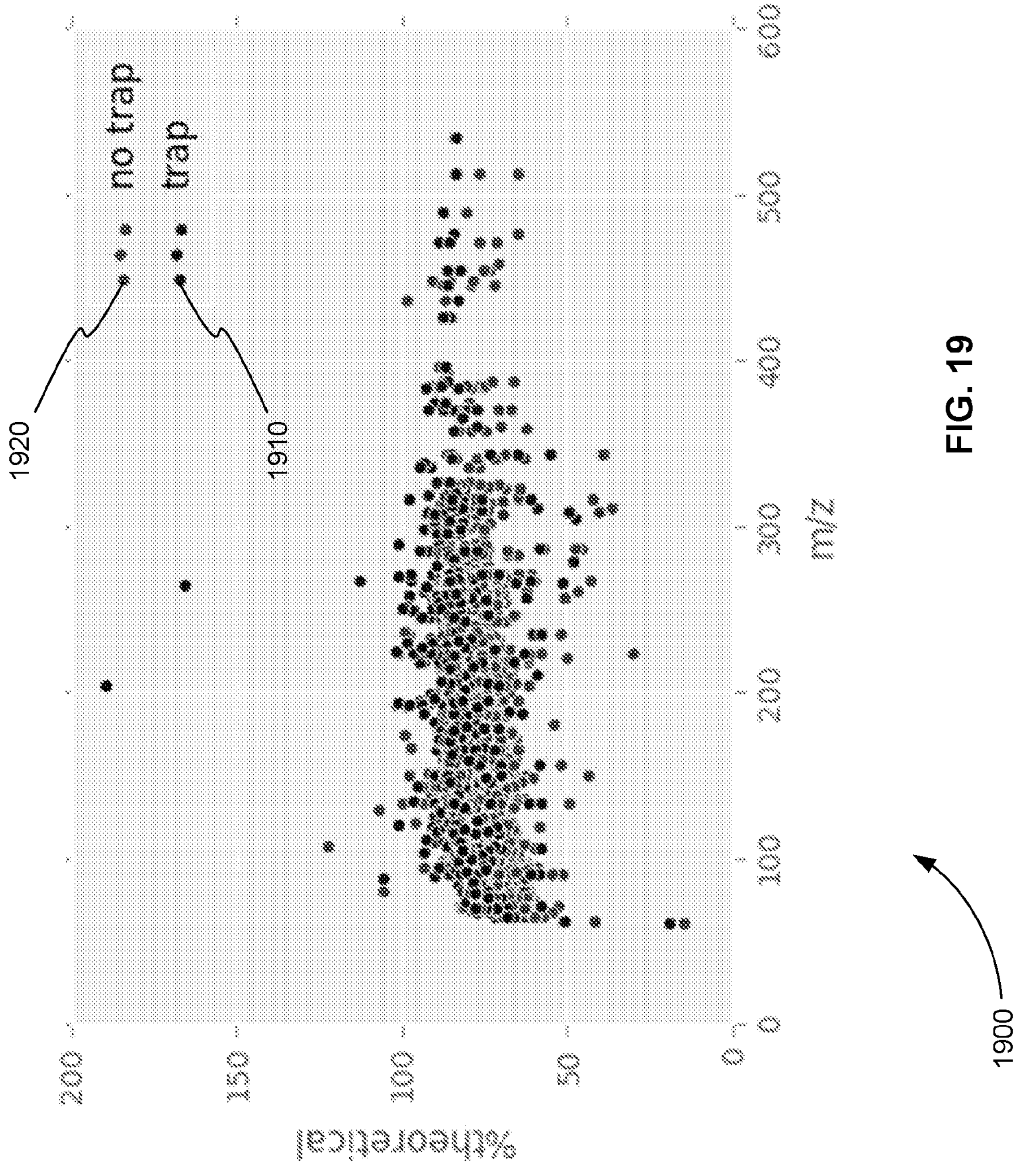
FIG. 19 is an exemplary plot of experimental data showing how pre-trapping ions before a Zeno ion guide can increase the gain produced by Zeno pulsing to a value closer to the theoretical value, in accordance with various embodiments.

FIG. 19 is an exemplary plot 1900 of experimental data showing how pre-trapping ions before a Zeno ion guide can increase the gain produced by Zeno pulsing to a value closer to the theoretical value, in accordance with various embodiments. Plot 1900 shows that, on average, Zeno experiments with pre-trapping 1910 produced gains closer to the theoretical gain than Zeno experiments with no pre-trapping 1920. Specifically, the average gain as a percentage of the theoretical gain for Zeno experiments with pre-trapping 1910 was 83.0. The average gain as a percentage of the theoretical gain for Zeno experiments with no pre-trapping 1920 was 73.6. In addition, the percentage of ions with an acceptable deviation from the expected for Zeno experiments with pre-trapping 1910 was 94.3. In contrast, the percentage of ions with an acceptable deviation from the expected for Zeno experiments with no pre-trapping 1920 was 90.1.

Figure 20:
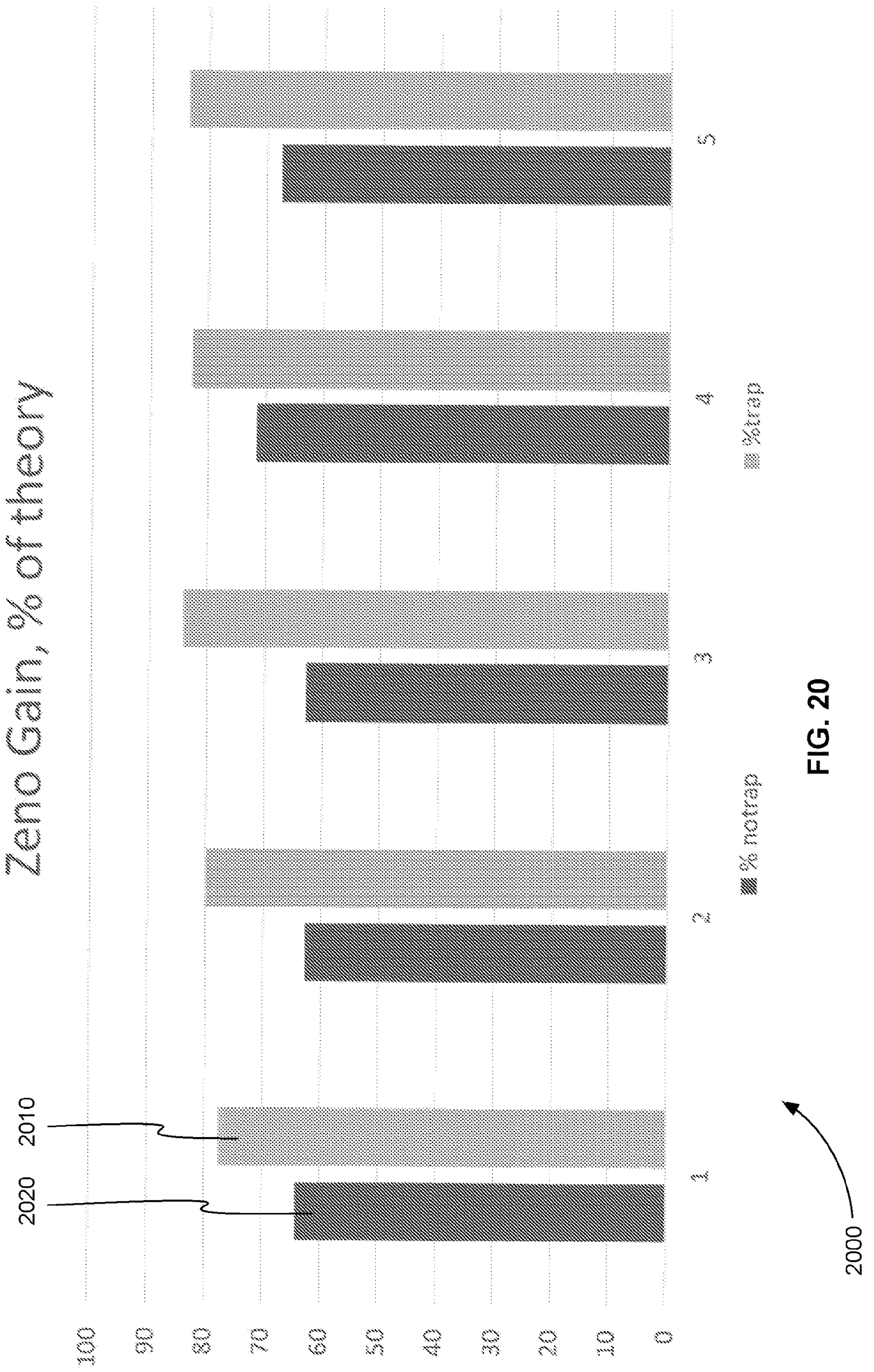
FIG. 20 is an exemplary plot of Zeno gain as a percentage of the theoretical gain for Zeno experiments with pre-trapping and no pre-trapping for five precursor ion to product ion transitions, in accordance with various embodiments.

FIG. 20 is an exemplary plot 2000 of Zeno gain as a percentage of the theoretical gain for Zeno experiments with pre-trapping and no pre-trapping for five precursor ion to product ion transitions, in accordance with various embodiments. Plot 2000 shows that Zeno experiments with pre-trapping 2010 produced Zeno gains that were a higher percentage of the theoretical gain than Zeno experiments with no pre-trapping 2010 for all five precursor ion to product ion transitions.

Reducing AC Effects Through Short Application of Zeno AC Voltage

In various embodiments, unexpected fragmentation or loss due the Zeno AC voltage is reduced by shortening the AC voltage duration. Some fragmentation or loss can still occur as ions approach or enter the ion guide when the AC voltage is on. However, as long as the AC voltage duration is a smaller fraction of the total Zeno cycle time than the AC voltage duration used in traditional Zeno pulsing, the unwanted AC effects are reduced. As described above in the pre-trapping embodiment, the AC voltage duration can be shortened by using a DC voltage to cool the ions in the Zeno cell.

Returning to FIG. 9, without pre-trapping, ions are continually flowing into ion guide 910. As a result, limiting the time the Zeno AC voltage is applied to ion guide electrodes 912 reduces the unwanted AC effects on the ions entering through entrance aperture 911.

Figure 21:
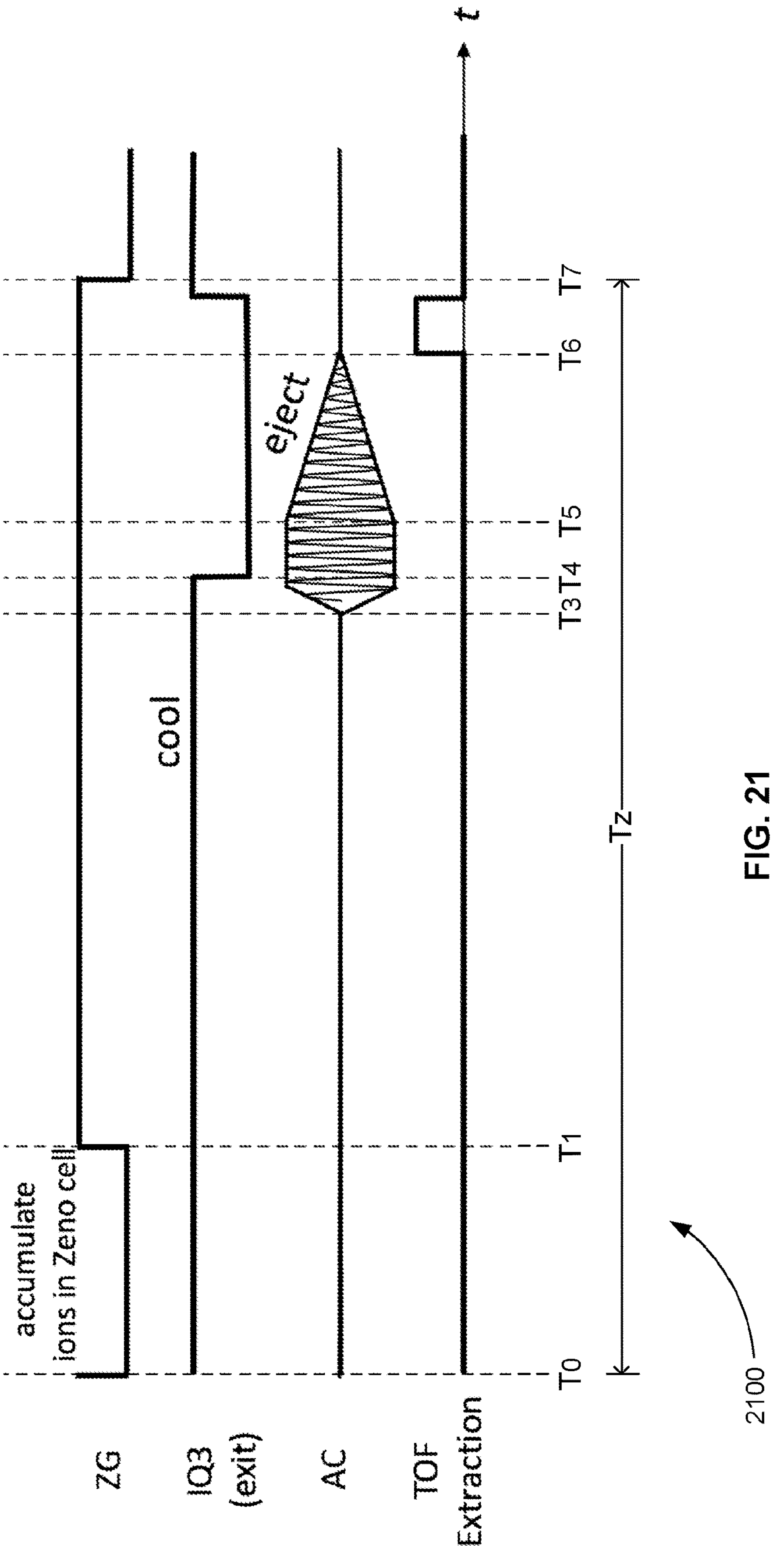
FIG. 21 is an exemplary timing diagram that shows how the system of FIG. 9 is operated to shorten the time the Zeno AC voltage applied to reduce the unwanted AC effects on ions as they enter the system, in accordance with various embodiments.

FIG. 21 is an exemplary timing diagram 2100 that shows how the system of FIG. 9 is operated to shorten the time the Zeno AC voltage applied to reduce the unwanted AC effects on ions as they enter the system, in accordance with various embodiments. Note that in comparison to FIG. 12 there is no IQ2B electrode. This means that there is no time $T_2$ for closing the IQ2B electrode, and, ions are continually being transferred to the ion guide for the entire Zeno cycle $T_Z$.

Like FIG. 12, however, in the time period $T_3-T_1$, ions trapped in the Zeno cell are cooled while ions continue to be transferred from the ion trap to the ion guide. This cooling time period is created by changing the DC voltage of the ZQ electrode and delaying the start of the AC voltage. This, in turn, allows the time period of the AC voltage, $T_6-T_3$, to be reduced. In other words, the AC voltage is not used to cool the ions trapped in the Zeno cell. A comparison of FIG. 21 with FIG. 10 also shows that traditional Zeno pulsing has no time period similar to the time period $T_3-T_1$ of FIG. 21 for cooling ions in the Zeno cell using DC voltages.

Unlike the pre-trapping case, during the time period of the AC voltage $T_6-T_3$ ions are still entering the ion guide and can be adversely affected by the AC voltage. However, since the time period $T_6-T_3$ is reduced, the unwanted effects of the AC voltage are also reduced.

Continuing the example times described above, the entire Zeno cycle $T_Z$ is 667 μs. The time period of the AC voltage $T_6-T_3$ is ~267 μs. The ratio of the AC voltage duration to the Zeno cycle is then ~0.4. So, the AC voltage is only on about 40% of the time. In traditional Zeno pulsing, as shown in FIG. 10, the time period of the AC voltage, or AC voltage duration, is ~500 μs or about 75% of the Zeno cycle time.

In various embodiments, the Zeno cycle time can be increased or the AC voltage duration can be reduced further to make the AC voltage duration a smaller fraction of the Zeno cycle time. For example, if the AC voltage duration $T_6-T_3$ remains at ~267 μs and the Zeno cycle $T_Z$ is increased to 2.67 ms, then the AC voltage is only on about 10% of the time. Similarly, if the Zeno cycle $T_Z$ remains at 667 μs and the AC voltage duration $T_6-T_3$ is reduced to ~167 μs, then the AC voltage is only on about 25% of the time.

System for Reducing Unwanted Effects of the Zeno AC Voltage

Returning to FIG. 9, ion guide 910 sequentially ejects ions according to m/z value using a ramped AC voltage, while reducing or eliminating the effects of the AC voltage on ions entering ion guide 910, in accordance with various embodiments. Ion guide 910 includes at least one set of axial rods surrounding an axial ion path. In FIG. 9, only one set of axial rods is used. In FIG. 11, for example, two sets of axial rods are used.

In FIG. 9, ion guide 910 includes entrance aperture 911 at one end of at least one set of axial rods 912 through which ions are received axially into the ion path. Ion guide 910 includes exit electrode 914 at the other end of at least one set of axial rods 912 through which ions are ejected axially from the ion path. Finally, ion guide 910 includes barrier electrode 913 located between entrance aperture 911 and exit electrode 914. Barrier electrode 913 separates the axial path into a first cell (e.g., the collision cell) between entrance aperture 911 and barrier electrode 913 and a second cell (e.g., the Zeno cell) between barrier electrode 913 and exit electrode 914.

Each time cycle of ion guide 910 includes an accumulation time period and a cooling time period before an AC time period in which a ramped AC voltage is applied to at least one set of axial rods 912 to eject ions according to m/z value.

During the accumulation time period, ions are received from outside of ion guide 910 through entrance aperture 911 and into the first cell. A low DC voltage is applied to barrier electrode 913 to receive ions from the first cell into the second cell. And, a high DC voltage is applied to exit electrode 914 to prevent ions from exiting ion guide 910.

During the cooling time period, a high DC voltage is applied to barrier electrode 913 to trap and cool ions in the second cell and to allow ions to continue to be received into the first cell without being affected by the ramped AC voltage.

In various embodiments, an ion trap (not shown) and an entrance electrode (not shown) are used to eliminate any effects of the ramped AC voltage on ions near or entering ion guide 910. An ion trap 1310 and an entrance electrode 1321 are shown in FIG. 13, for example.

Returning to FIG. 9, the ion trap is located along the ion path before entrance aperture 911 and the entrance electrode is located at entrance aperture 911. During the accumulation time period and the cooling time period, the ion trap injects ions through the entrance electrode into the first cell. During the AC time period, a high DC voltage is applied to the entrance electrode to prevent ions from being received into the first cell from the ion trap. And, the ion trap accumulates ions in order to eliminate any effects of the ramped AC voltage on ions moving from the ion trap to the first cell.

The ion guide can be, but is not limited to, an electron-based dissociation (ExD) device, an electron capture dissociation (ECD) device, a linear ion trap, an electrostatic linear ion trap (ELIT), a Fourier transform ion cyclotron resonance (FT-ICR) device, or an orbitrap.

In various embodiments, any effects of the ramped AC voltage on ions near or entering ion guide 910 are reduced by making the AC time period a smaller portion of the entire time cycle of ion guide 910. For example, voltages are applied to at least one set of axial rods 912, exit electrode 914, and barrier electrode 913 so that a ratio of the AC time period to each time cycle of ion guide 912 is in a range between two values in order to reduce any effects of ions entering the first cell from the ramped AC voltage. The range can include the two values. For example, the range can be 0 to 0.1, 0.1 to 0.2, 0.2 to 0.3, 0.3 to 0.4, or 0.4 to 0.5.

In various embodiments, a processor (not shown) is used to control or provide instructions to ion guide 910, the ion trap, and the entrance electrode. The processor controls or provides instructions by, for example, controlling one or more voltage, current, or pressure sources. The processor can be a separate device or can be a processor or controller of one or more devices of a mass spectrometer. The processor can be, but is not limited to, a controller, a computer, a microprocessor, the computer system of FIG. 1, or any device capable of sending and receiving control signals and data.

Method for Reducing Unwanted Effects of the Zeno AC Voltage

Figure 22:
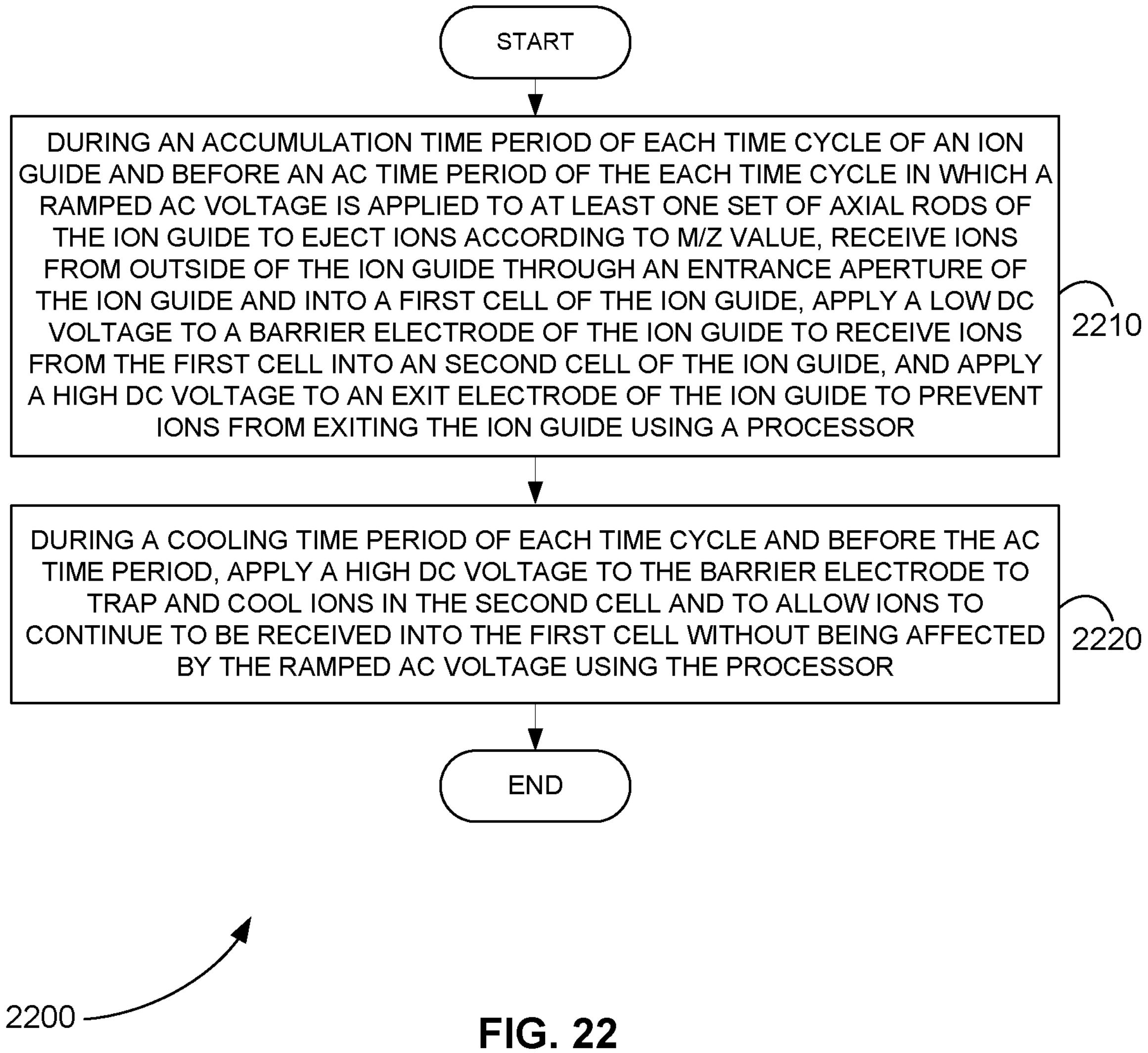
FIG. 22 is a flowchart showing a method for sequentially ejecting ions from an ion guide according to m/z value using a ramped AC voltage while reducing or eliminating the effects of the AC voltage on ions entering the ion guide, in accordance with various embodiments.

FIG. 22 is a flowchart showing a method 2200 for sequentially ejecting ions from an ion guide according to m/z value using a ramped AC voltage while reducing or eliminating the effects of the AC voltage on ions entering the ion guide, in accordance with various embodiments.

In step 2210 of method 2200, during an accumulation time period of each time cycle of an ion guide and before an AC time period of each time cycle in which a ramped AC voltage is applied to at least one set of axial rods of the ion guide to eject ions according to m/z value, a number of steps are performed using a processor. Ions are received from outside of the ion guide through an entrance aperture of the ion guide and into a first cell of the ion guide. A low DC voltage is applied to a barrier electrode of the ion guide to receive ions from the first cell into a second cell of the ion guide. And, a high DC voltage is applied to an exit electrode of the ion guide to prevent ions from exiting the ion guide.

The entrance aperture is located at one end of the at least one set of axial rods. The exit electrode is located at the other end of the at least one set of axial rods. The barrier electrode is located between the entrance aperture and the exit electrode and separates the ion guide into the first cell before the barrier electrode and the second cell after the barrier electrode.

In step 2220, during a cooling time period of each time cycle and before the AC time period, an additional step is performed using the processor. A high DC voltage is applied to the barrier electrode to trap and cool ions in the second cell and to allow ions to continue to be received into the first cell without being affected by the ramped AC voltage.

Computer Program Product for Reducing Unwanted Effects of the Zeno AC Voltage

In various embodiments, a computer program product includes a non-transitory tangible computer-readable storage medium whose contents include a program with instructions being executed on a processor so as to perform a method for sequentially ejecting ions from an ion guide according to m/z value using a ramped AC voltage while reducing or eliminating the effects of the AC voltage on ions entering the ion guide. This method is performed by a system that includes one or more distinct software modules.

Figure 23:
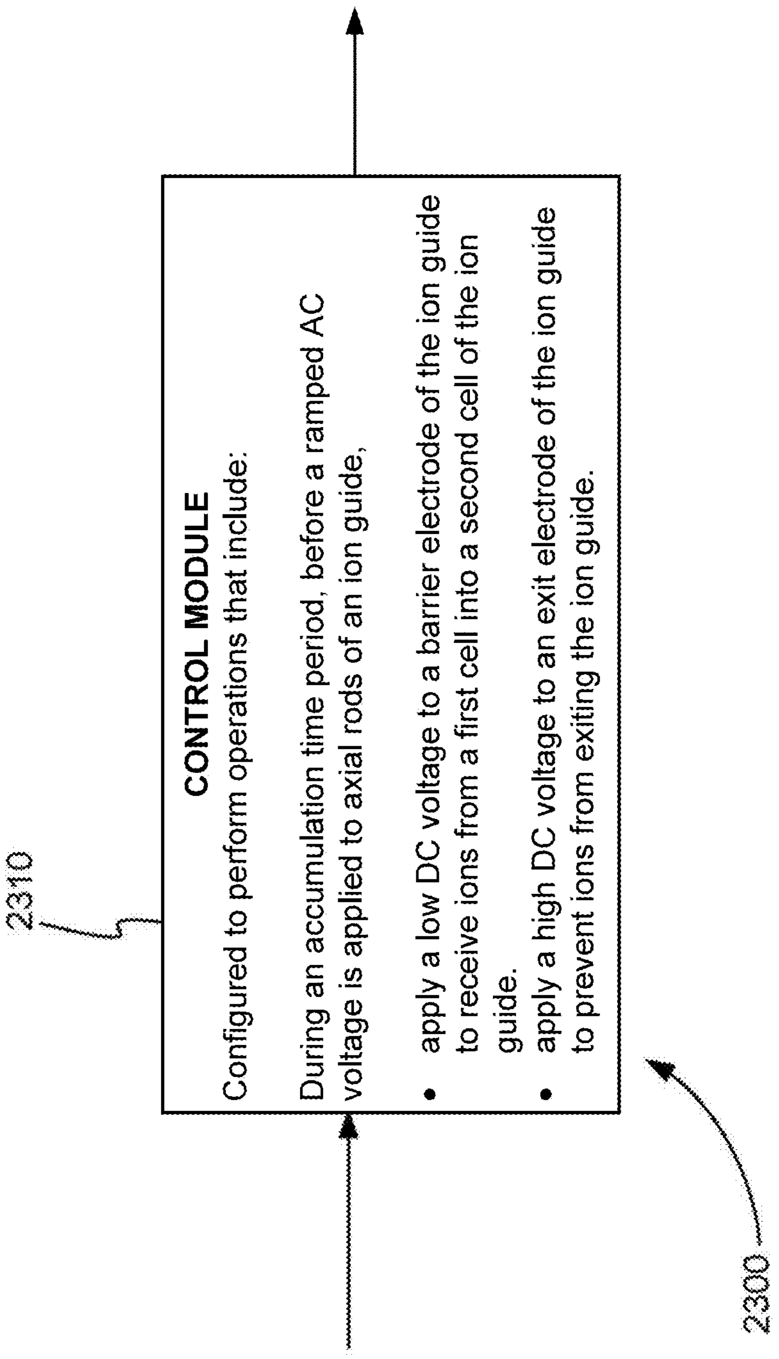
FIG. 23 is a schematic diagram of a system that includes one or more distinct software modules that performs a method for sequentially ejecting ions from an ion guide according to m/z value using a ramped AC voltage while reducing or eliminating the effects of the AC voltage on ions entering the ion guide, in accordance with various embodiments.

More generally, FIG. 23 is a schematic diagram of a system 2300 that includes one or more distinct software modules that performs a method for sequentially ejecting ions from an ion guide according to m/z value using a ramped AC voltage while reducing or eliminating the effects of the AC voltage on ions entering the ion guide, in accordance with various embodiments. System 2300 includes control module 2310.

During an accumulation time period of each time cycle of an ion guide and before an AC time period of each time cycle in which a ramped AC voltage is applied to at least one set of axial rods of the ion guide to eject ions according to m/z value, control module 2310 performs a number of steps. Ions are received from outside of the ion guide through an entrance aperture of the ion guide and into a first cell of the ion guide. A low DC voltage is applied to a barrier electrode of the ion guide to receive ions from the first cell into a second cell of the ion guide. And, a high DC voltage is applied to an exit electrode of the ion guide to prevent ions from exiting the ion guide.

The entrance aperture is located at one end of the at least one set of axial rods. The exit electrode is located at the other end of the at least one set of axial rods. The barrier electrode is located between the entrance aperture and the exit electrode and separates the ion guide into the first cell before the barrier electrode and the second cell after the barrier electrode.

During a cooling time period of each time cycle and before the AC time period, control module 2310 performs an additional step. A high DC voltage is applied to the barrier electrode to trap and cool ions in the second cell and to allow ions to continue to be received into the first cell without being affected by the ramped AC voltage.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An ion guide for sequentially ejecting ions according to mass-to-charge ratio (m/z) value using a ramped alternating current (AC) voltage while reducing or eliminating the effects of the AC voltage on ions entering the ion guide, comprising:

at least one set of axial rods surrounding an axial ion path;

an entrance aperture at one end of the at least one set of axial rods through which ions are received axially into the ion path;

an exit electrode at the other end of the at least one set of axial rods through which ions are ejected axially from the ion path; and a barrier electrode located between the entrance aperture and the exit electrode that separates the axial path into a first cell between the entrance aperture and the barrier electrode and a second cell between the barrier electrode and the exit electrode, wherein, for each time cycle of the ion guide, during an accumulation time period and before an AC time period in which a ramped AC voltage is applied to the at least one set of axial rods to eject ions according to m/z value, ions are received from outside of the ion guide through the entrance aperture and into the first cell, a low direct current (DC) voltage is applied to the barrier electrode to receive ions from the first cell into the second cell, and a high DC voltage is applied to the exit electrode to prevent ions from exiting the ion guide, and, during a cooling time period and before the AC time period, a high DC voltage is applied to the barrier electrode to trap and cool ions in the second cell and to allow ions to continue to be received into the first cell without being affected by the ramped AC voltage.

2. The ion guide of claim 1, further comprising an ion trap located along the ion path before the entrance aperture and an entrance electrode located at the entrance aperture, wherein, during the accumulation time period and the cooling time period, the ion trap injects ions through the entrance electrode into the first cell and wherein, during the AC time period, a high DC voltage is applied to the entrance electrode to prevent ions from being received into the first cell from the ion trap and the ion trap accumulates ions in order to eliminate any effects of the ramped AC voltage on ions moving from the ion trap to the first cell.

3. The ion guide of claim 2, wherein the ion trap comprises an electron-based dissociation (ExD) device.

4. The ion guide of claim 2, wherein the ion trap comprises an electron capture dissociation (ECD) device.

5. The ion guide of claim 2, wherein the ion trap comprises a linear ion trap.

6. The ion guide of claim 2, wherein the ion trap comprises an electrostatic linear ion trap (ELIT).

7. The ion guide of claim 2, wherein the ion trap comprises a Fourier transform ion cyclotron resonance (FT-ICR) device.

8. The ion guide of claim 2, wherein the ion trap comprises an orbitrap.

9. The ion guide of claim 1, wherein voltages are applied to the at least one set of axial rods, the exit electrode, and the barrier electrode so that a ratio of the AC time period to the each time cycle of the ion guide is in the range of 0 to 0.1 in order to reduce any effects of ions entering the first cell from the ramped AC voltage.

10. The ion guide of claim 1, wherein voltages are applied to the at least one set of axial rods, the exit electrode, and the barrier electrode so that a ratio of the AC time period to the each time cycle of the ion guide is in the range of 0.1 to 0.2 in order to reduce any effects of ions entering the first cell from the ramped AC voltage.

11. The ion guide of claim 1, wherein voltages are applied to the at least one set of axial rods, the exit electrode, and the barrier electrode so that a ratio of the AC time period to the each time cycle of the ion guide is in the range of 0.2 to 0.3 in order to reduce any effects of ions entering the first cell from the ramped AC voltage.

12. The ion guide of claim 1, wherein voltages are applied to the at least one set of axial rods, the exit electrode, and the barrier electrode so that a ratio of the AC time period to the each time cycle of the ion guide is in the range of 0.3 to 0.4 in order to reduce any effects of ions entering the first cell from the ramped AC voltage.

13. The ion guide of claim 1, wherein voltages are applied to the at least one set of axial rods, the exit electrode, and the barrier electrode so that a ratio of the AC time period to the each time cycle of the ion guide is in the range of 0.4 to 0.5 in order to reduce any effects of ions entering the first cell from the ramped AC voltage.

14. A method for sequentially ejecting ions from an ion guide according to mass-to-charge ratio (m/z) value using a ramped alternating current (AC) voltage while reducing or eliminating the effects of the AC voltage on ions entering the ion guide, comprising:

during an accumulation time period of each time cycle of an ion guide and before an AC time period of the each time cycle in which a ramped AC voltage is applied to at least one set of axial rods of the ion guide to eject ions according to m/z value, receiving ions from outside of the ion guide through an entrance aperture of the ion guide and into a first cell of the ion guide, applying a low direct current (DC) voltage to a barrier electrode of the ion guide to receive ions from the first cell into a second cell of the ion guide, and applying a high DC voltage to an exit electrode of the ion guide to prevent ions from exiting the ion guide using a processor, wherein the entrance aperture is located at one end of the at least one set of axial rods, the exit electrode is located at the other end of the at least one set of axial rods, and the barrier electrode is located between the entrance aperture and the exit electrode and separates the ion guide into the first cell before the barrier electrode and the second cell after the barrier electrode; and during a cooling time period of the each time cycle and before the AC time period, applying a high DC voltage to the barrier electrode to trap and cool ions in the second cell and to allow ions to continue to be received into the first cell without being affected by the ramped AC voltage using the processor.

15. A computer program product, comprising a non-transitory tangible computer-readable storage medium whose contents include a program with instructions being executed on a processor so as to perform a method for sequentially ejecting ions from an ion guide according to mass-to-charge ratio (m/z) value using a ramped alternating current (AC) voltage while reducing or eliminating the effects of the AC voltage on ions entering the ion guide, comprising:

providing a system, wherein the system comprises one or more distinct software modules, and wherein the distinct software modules comprise a control module;

during an accumulation time period of each time cycle of an ion guide and before an AC time period of the each time cycle in which a ramped AC voltage is applied to at least one set of axial rods of the ion guide to eject ions according to m/z value, receiving ions from outside of the ion guide through an entrance aperture of the ion guide and into a first cell of the ion guide, applying a low direct current (DC) voltage to a barrier electrode of the ion guide to receive ions from the first cell into a second cell of the ion guide, and applying a high DC voltage to an exit electrode of the ion guide to prevent ions from exiting the ion guide using the control module, wherein the entrance aperture is located at one end of the at least one set of axial rods, the exit electrode is located at the other end of the at least one set of axial rods, and the barrier electrode is located between the entrance aperture and the exit electrode and separates the ion guide into the first cell before the barrier electrode and the second cell after the barrier electrode; and during a cooling time period of the each time cycle and before the AC time period, applying a high DC voltage to the barrier electrode to trap and cool ions in the second cell and allow ions to continue to be received into the first cell without being affected by the ramped AC voltage using the control module.

* * * * *